United States Patent
Szeto

(10) Patent No.: US 9,716,423 B1
(45) Date of Patent: Jul. 25, 2017

(54) TACTILE FEEDBACK ACTUATOR, ELECTRONIC DEVICE USING SAME, AND METHOD OF OPERATING SAME

(71) Applicant: NANOPORT TECHNOLOGY INC., Markham (CA)

(72) Inventor: Timothy Jing Yin Szeto, Markham (CA)

(73) Assignee: NANOPORT TECHNOLOGY INC., Markham (CA)

( * ) Notice: Subject to any disclaimer, the term of this patent is extended or adjusted under 35 U.S.C. 154(b) by 0 days.

(21) Appl. No.: 15/251,332

(22) Filed: Aug. 30, 2016

Related U.S. Application Data

(60) Provisional application No. 62/354,538, filed on Jun. 24, 2016.

(51) Int. Cl.
  *H02N 2/00* (2006.01)
  *H02K 33/12* (2006.01)
  *H02K 1/34* (2006.01)
  *H02K 3/28* (2006.01)

(52) U.S. Cl.
  CPC .............. *H02K 33/12* (2013.01); *H02K 1/34* (2013.01); *H02K 3/28* (2013.01)

(58) Field of Classification Search
  CPC .................................. H02K 1/34; H02K 33/12
  USPC ........................................ 310/26, 30; 29/596
  See application file for complete search history.

(56) References Cited

U.S. PATENT DOCUMENTS

| | | |
|---|---|---|
| 4,054,944 A | 10/1977 | Lau |
| 4,195,277 A | 3/1980 | Leicht |
| 4,527,469 A | 7/1985 | Wolf et al. |
| 4,658,646 A | 4/1987 | Bell et al. |
| 4,995,744 A | 2/1991 | Goldowsky et al. |
| 5,434,549 A * | 7/1995 | Hirabayashi ........... H02K 33/00 335/229 |
| 5,583,478 A | 12/1996 | Renzi |

(Continued)

FOREIGN PATENT DOCUMENTS

| | | |
|---|---|---|
| WO | 2010101577 A1 | 9/2010 |
| WO | 2016010180 A1 | 1/2016 |

OTHER PUBLICATIONS

Apple's Haptic Tech is a Glimpse at the UI of the Future, WIRED, All pages, Iowa, Retrieved from Internet on Feb. 17, 2016.

*Primary Examiner* — Hanh Nguyen
(74) *Attorney, Agent, or Firm* — Norton Rose Fulbright Canada LLP; Alexandre Daoust

(57) ABSTRACT

The tactile feedback actuator generally has a stopper, a damper, a hammer path between the stopper and the damper, a coil element fixedly mounted relative to the hammer path, and a magnetic hammer guidingly mounted for movement along the hammer path. The magnetic hammer has two opposite ends. Each end of the magnetic hammer has a corresponding permanent magnet. The two permanent magnets have opposing polarities. The magnetic hammer is electromagnetically engageable by a magnetic field emitted upon activation of the coil element so as to be longitudinally slid along the hammer path in any one of two opposite directions depending on a polarity of activation of the coil element. The stopper has a striking surface adapted for stopping the magnetic hammer, and the damper is adapted for decelerating the magnetic hammer as the magnetic hammer is longitudinally slid towards the damper.

23 Claims, 22 Drawing Sheets

(56) References Cited

U.S. PATENT DOCUMENTS

| | | | |
|---|---|---|---|
| 6,100,655 | A | 8/2000 | McIntosh |
| 6,982,696 | B1 | 1/2006 | Shahoian |
| 7,204,581 | B2 | 4/2007 | Peeters |
| 7,495,656 | B2 | 2/2009 | Yuba et al. |
| 7,741,938 | B2 | 6/2010 | Kramlich |
| 8,018,105 | B2 * | 9/2011 | Erixon .................. H02K 33/16 310/12.31 |
| 8,072,418 | B2 | 12/2011 | Crawford et al. |
| 8,855,705 | B2 | 10/2014 | Pasquero et al. |
| 8,866,774 | B2 | 10/2014 | Leem et al. |
| 8,884,746 | B1 | 11/2014 | Cho et al. |
| 8,970,072 | B2 * | 3/2015 | Headstrom .......... A61C 17/221 15/22.2 |
| 9,157,460 | B2 | 10/2015 | Joshi et al. |
| 2003/0142845 | A1 | 7/2003 | Miyamoto et al. |
| 2012/0068835 | A1 | 3/2012 | Li |
| 2012/0108299 | A1 | 5/2012 | Yang et al. |
| 2012/0194008 | A1 * | 8/2012 | Iijima .................. H02K 35/02 310/30 |
| 2013/0193693 | A1 | 8/2013 | Marin et al. |
| 2014/0035397 | A1 * | 2/2014 | Endo ...................... H02K 33/18 310/30 |
| 2014/0110508 | A1 | 4/2014 | Dames et al. |
| 2014/0346901 | A1 * | 11/2014 | Hayward .............. H02K 33/16 310/25 |
| 2015/0109223 | A1 | 4/2015 | Kessler et al. |
| 2015/0247548 | A1 | 9/2015 | Battlogg et al. |
| 2015/0349619 | A1 | 12/2015 | Degner et al. |
| 2016/0047433 | A1 | 2/2016 | Bronowicki |
| 2016/0172953 | A1 | 6/2016 | Degner et al. |

* cited by examiner

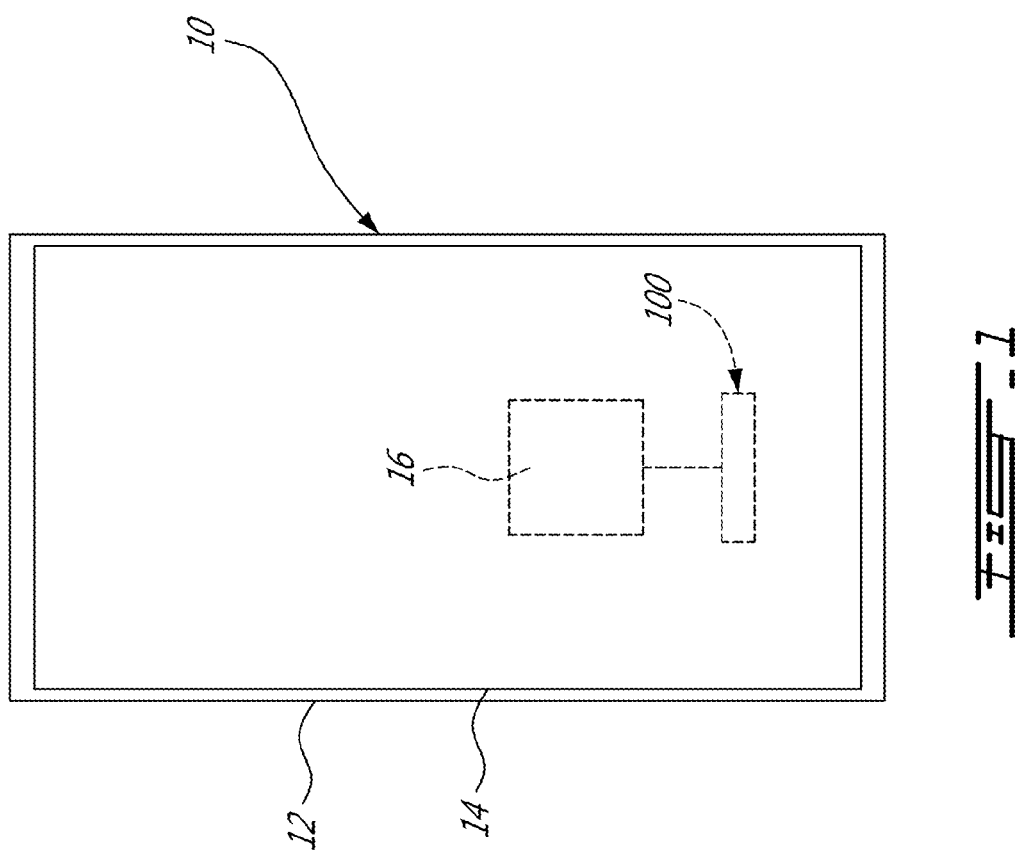

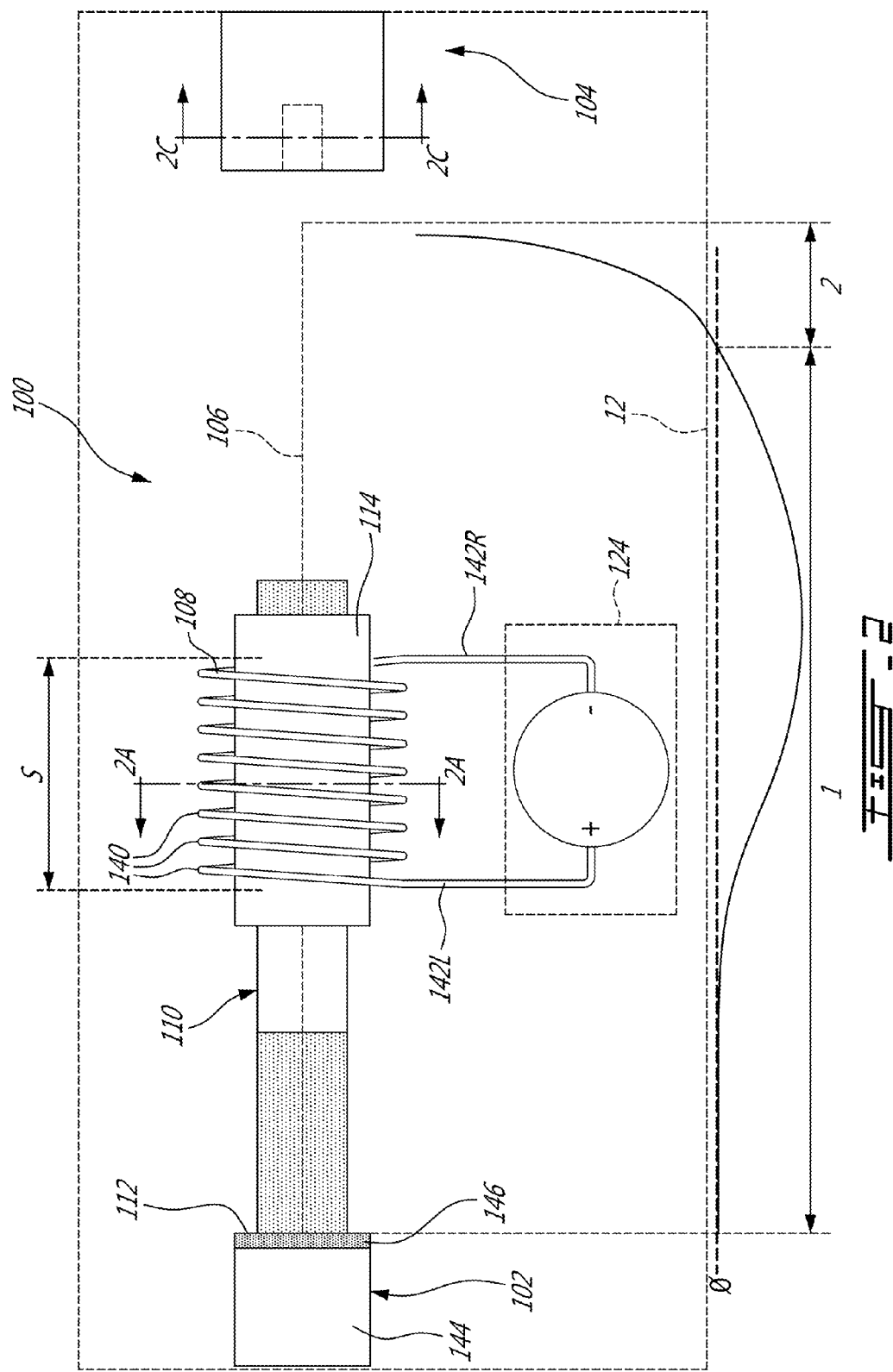

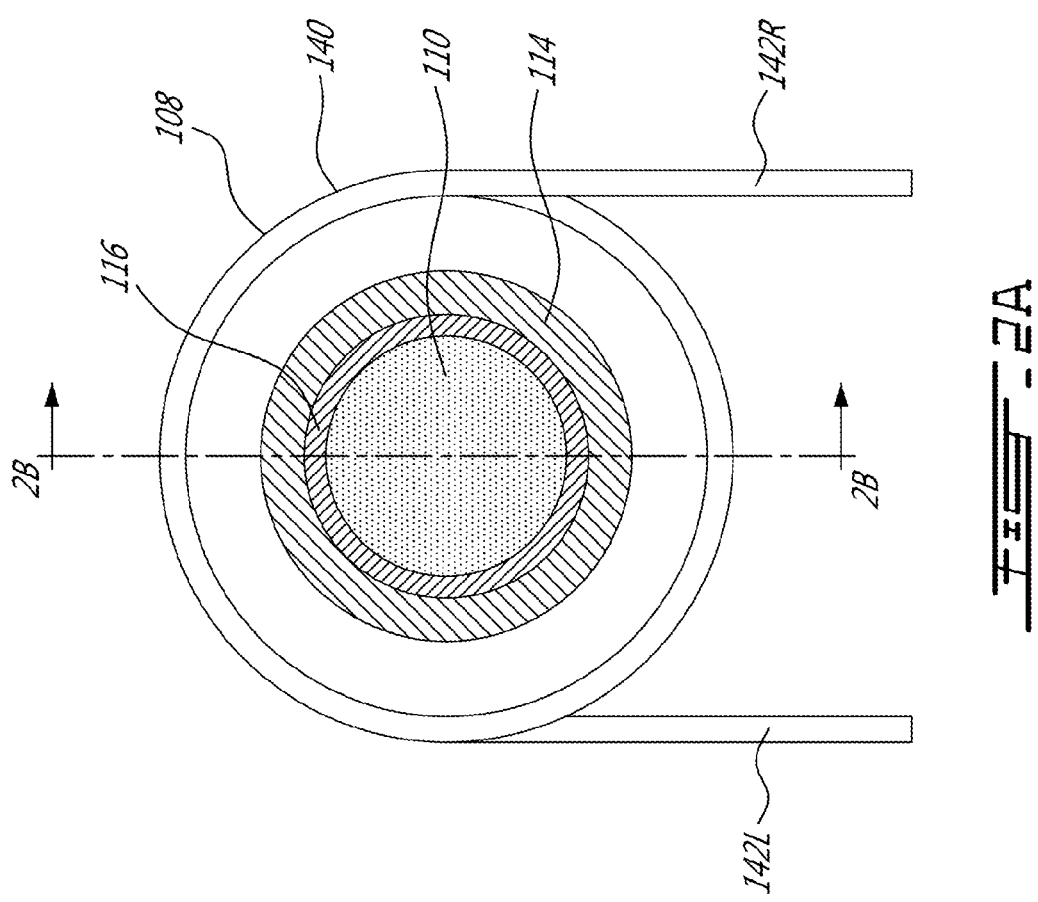

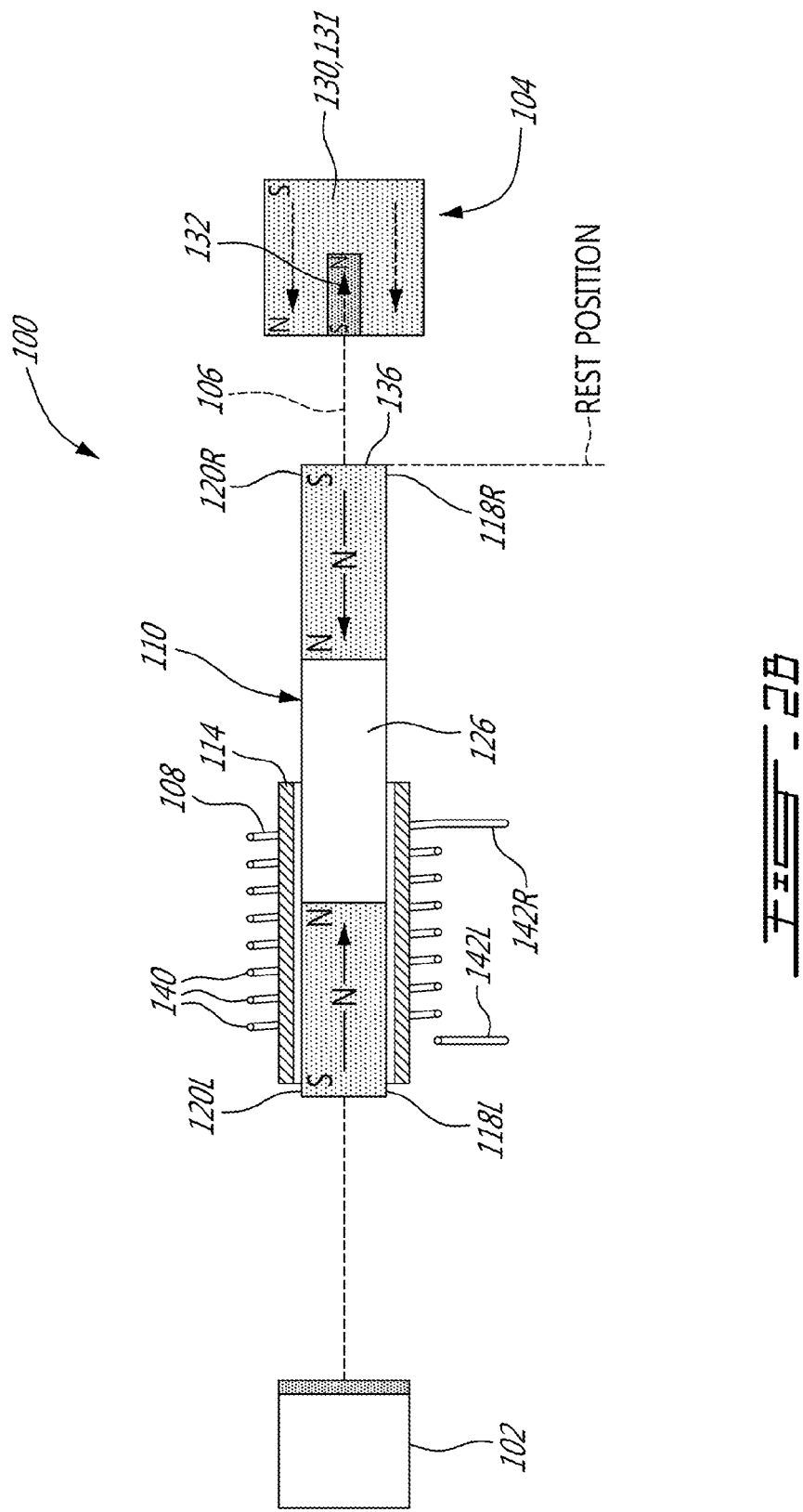

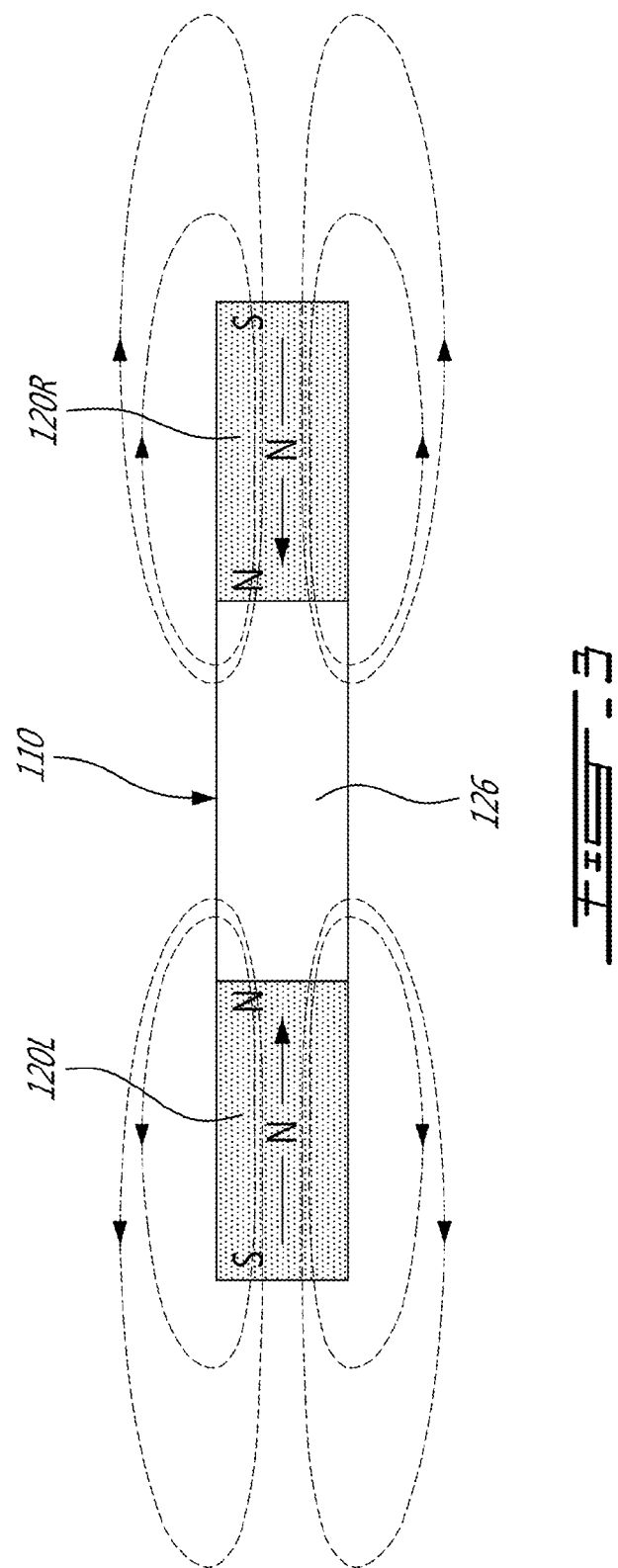

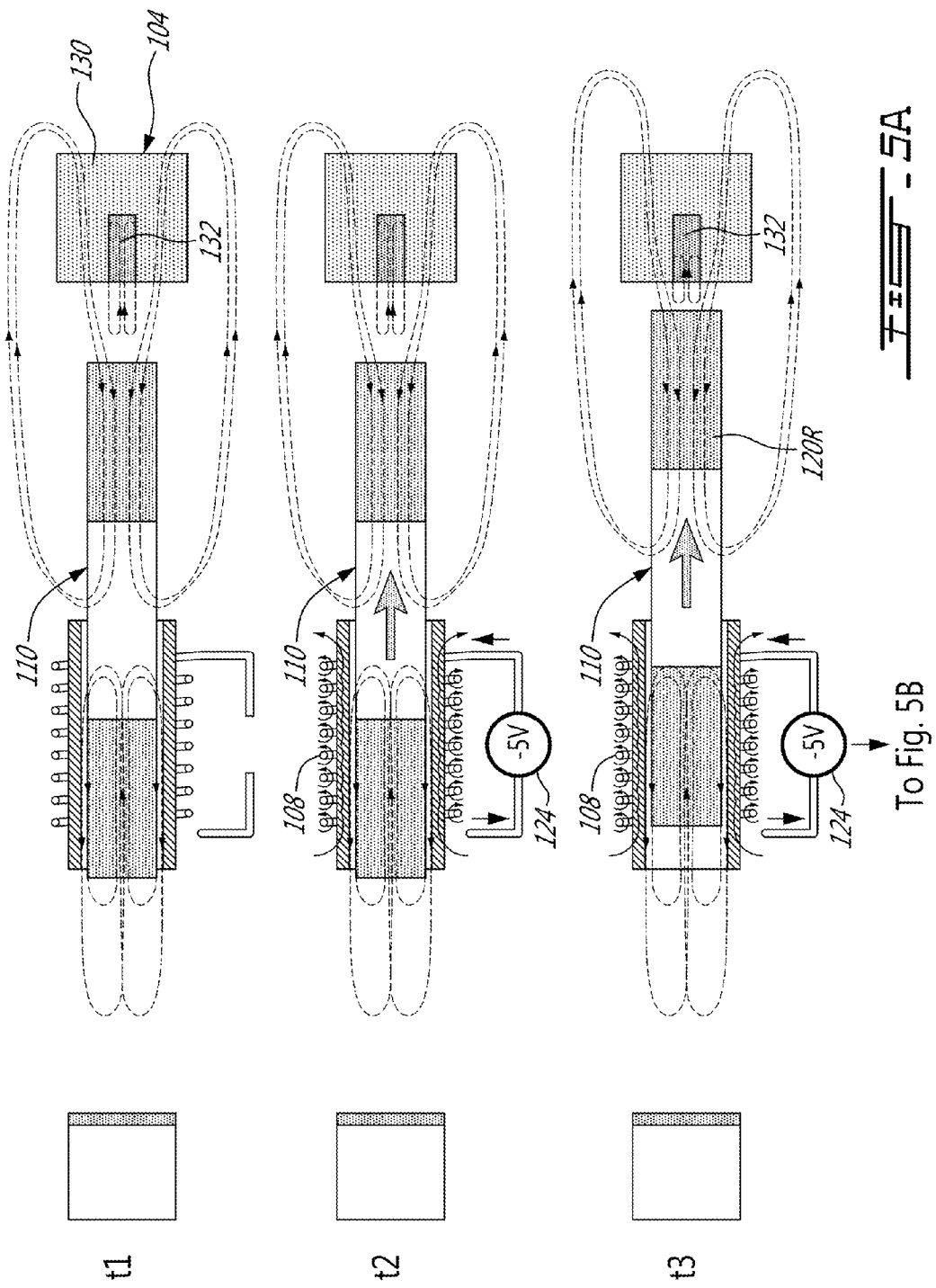

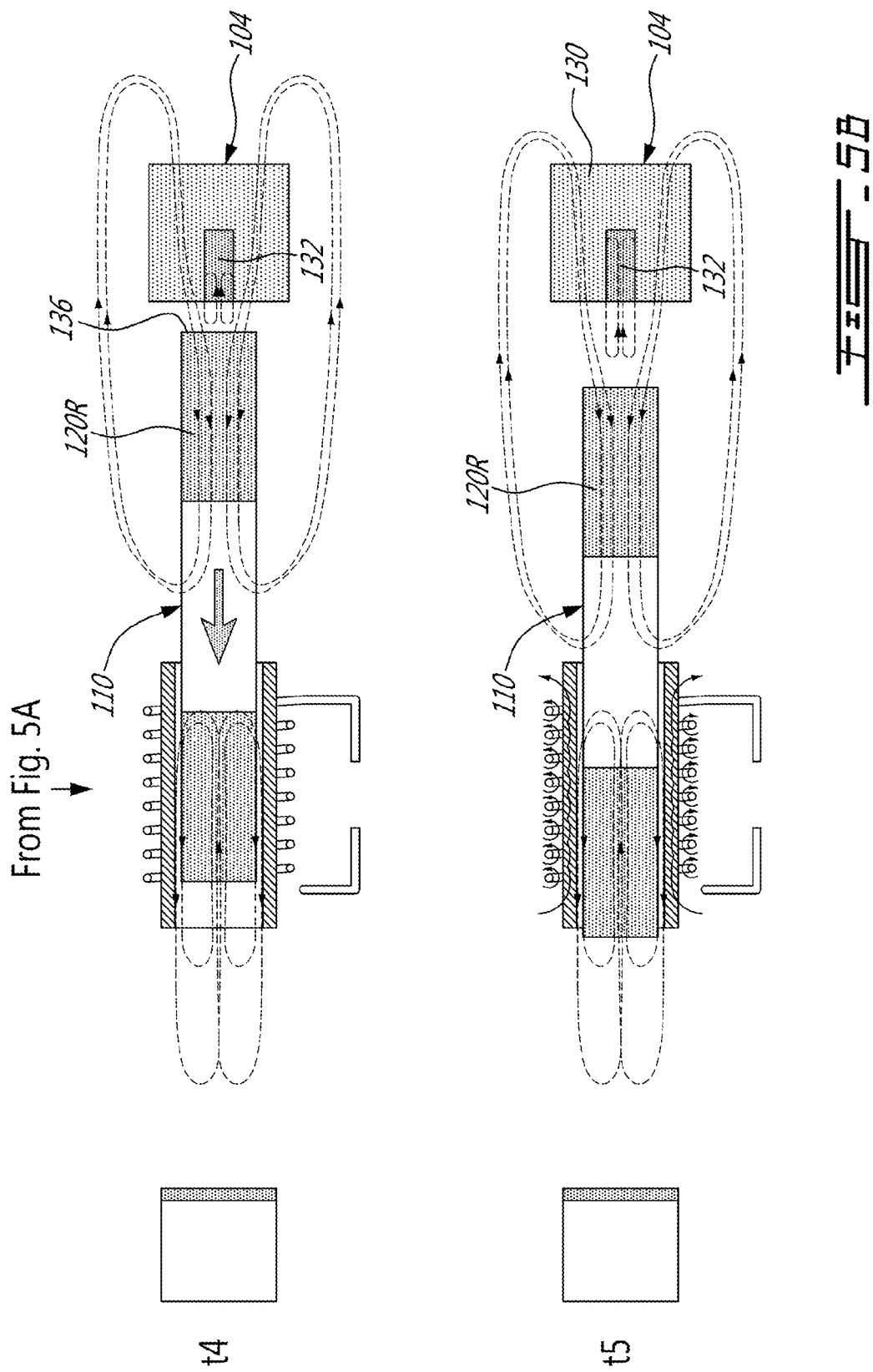

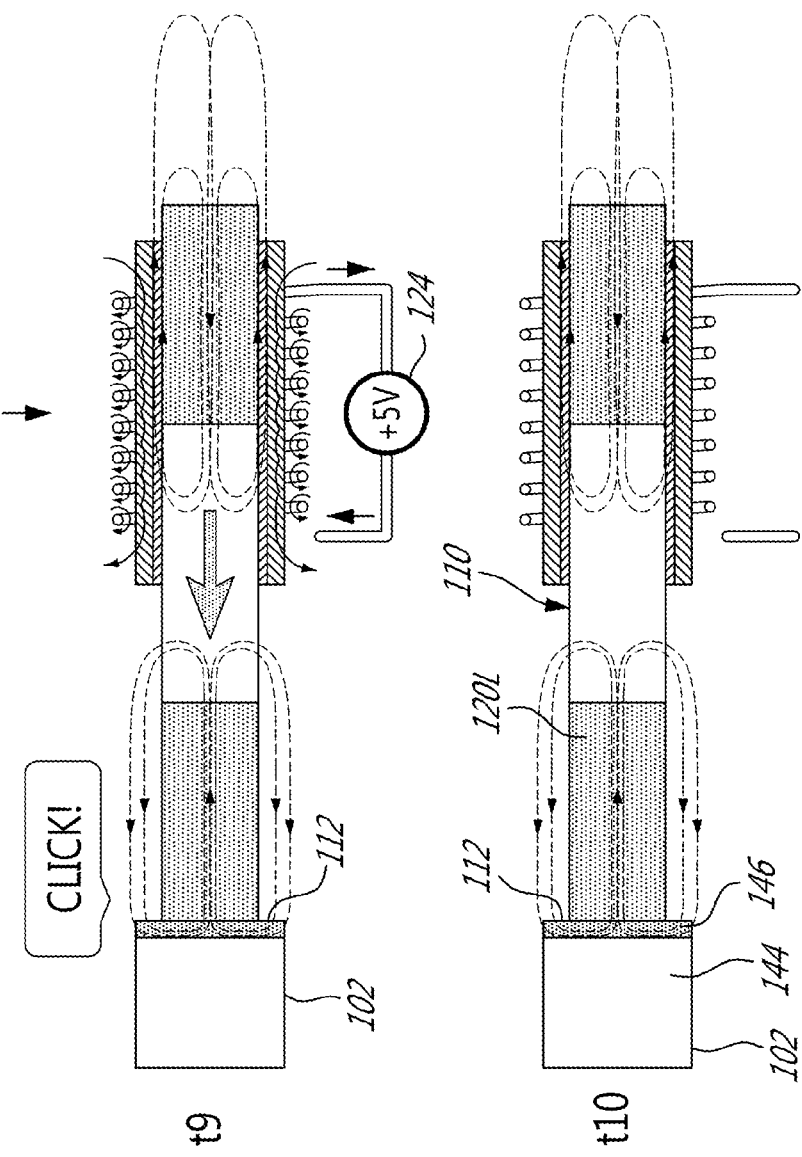
FIG. 6B

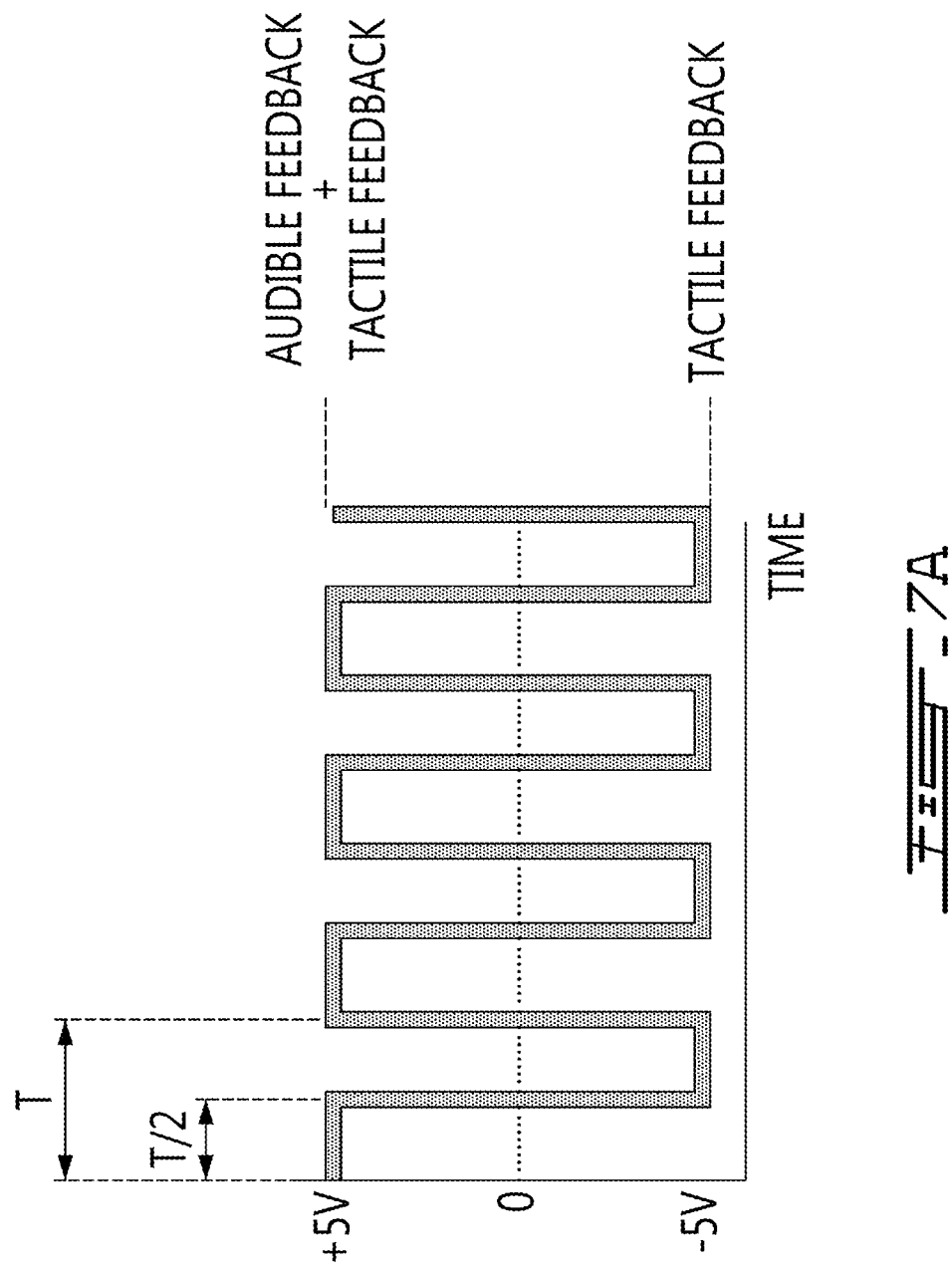

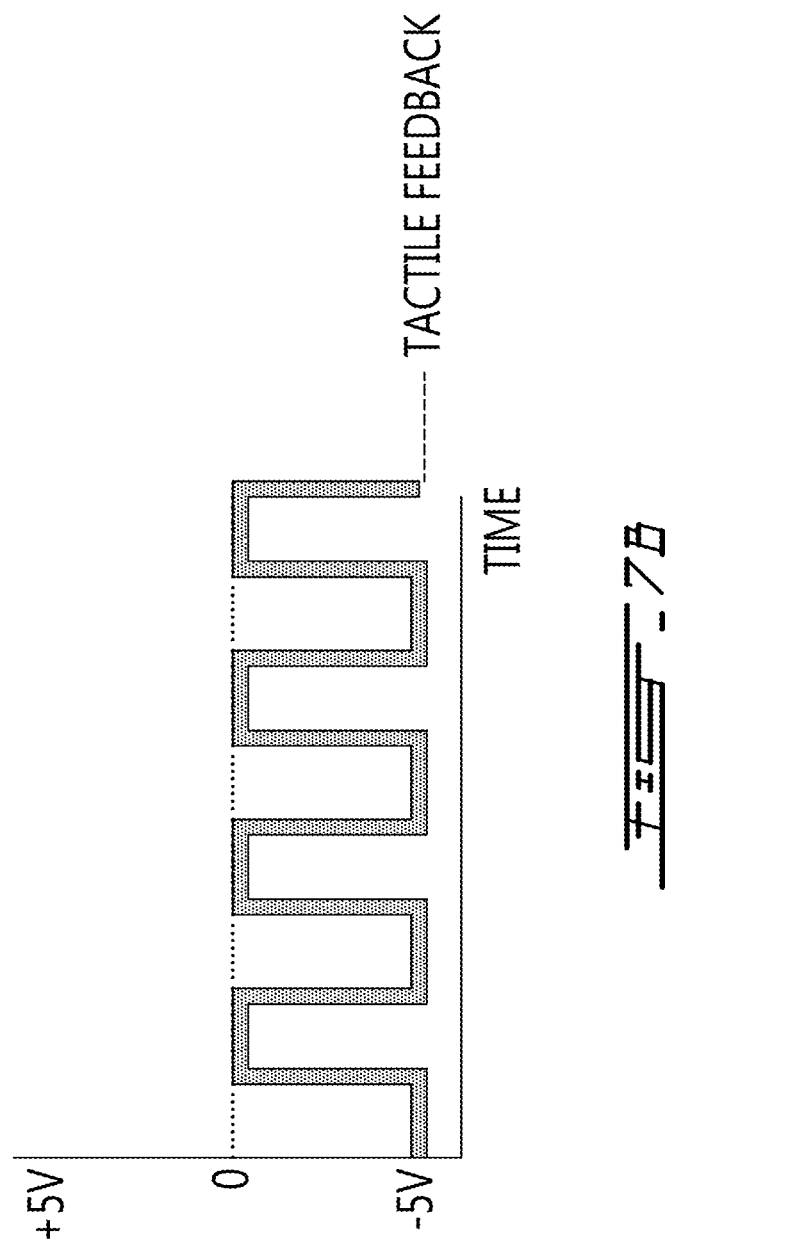

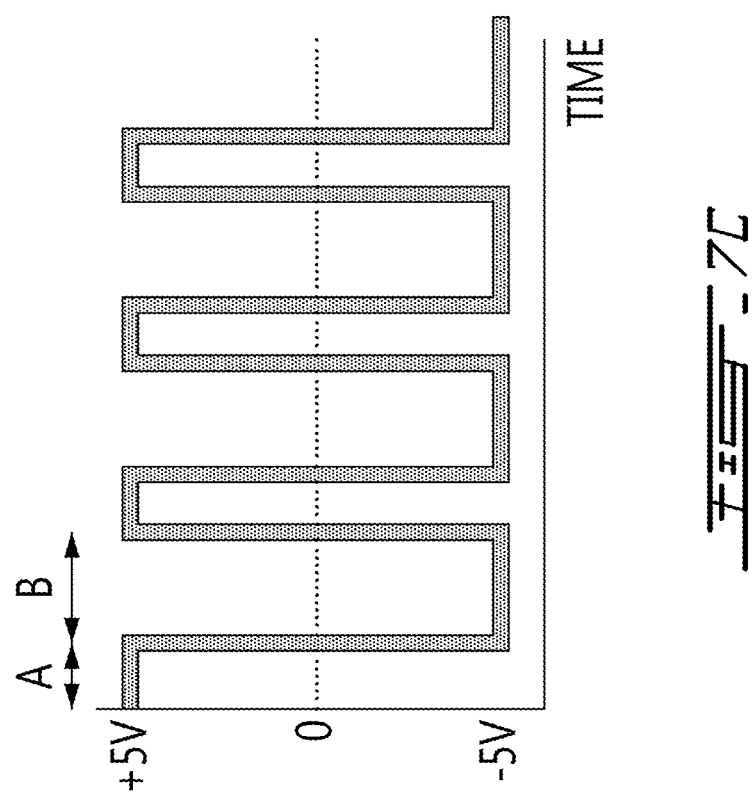

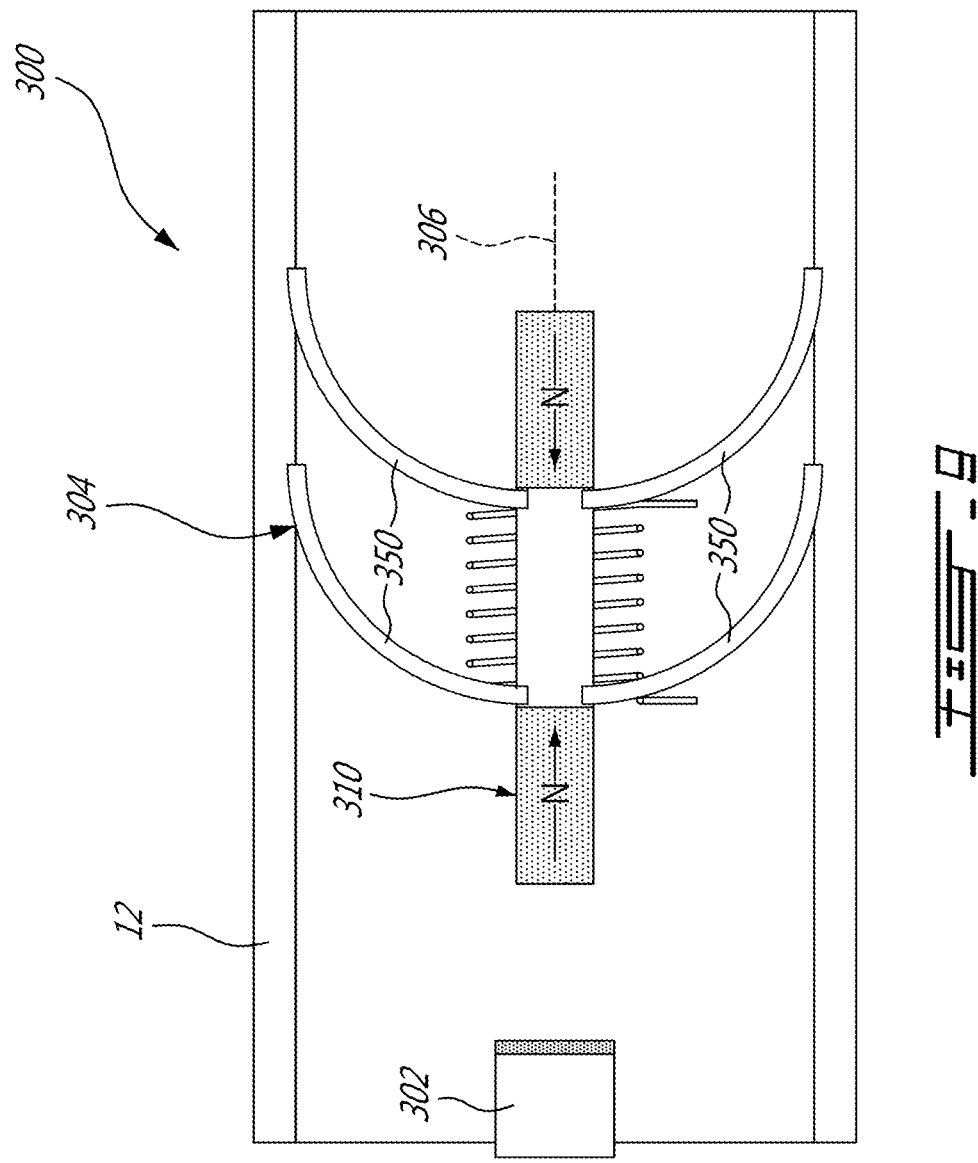

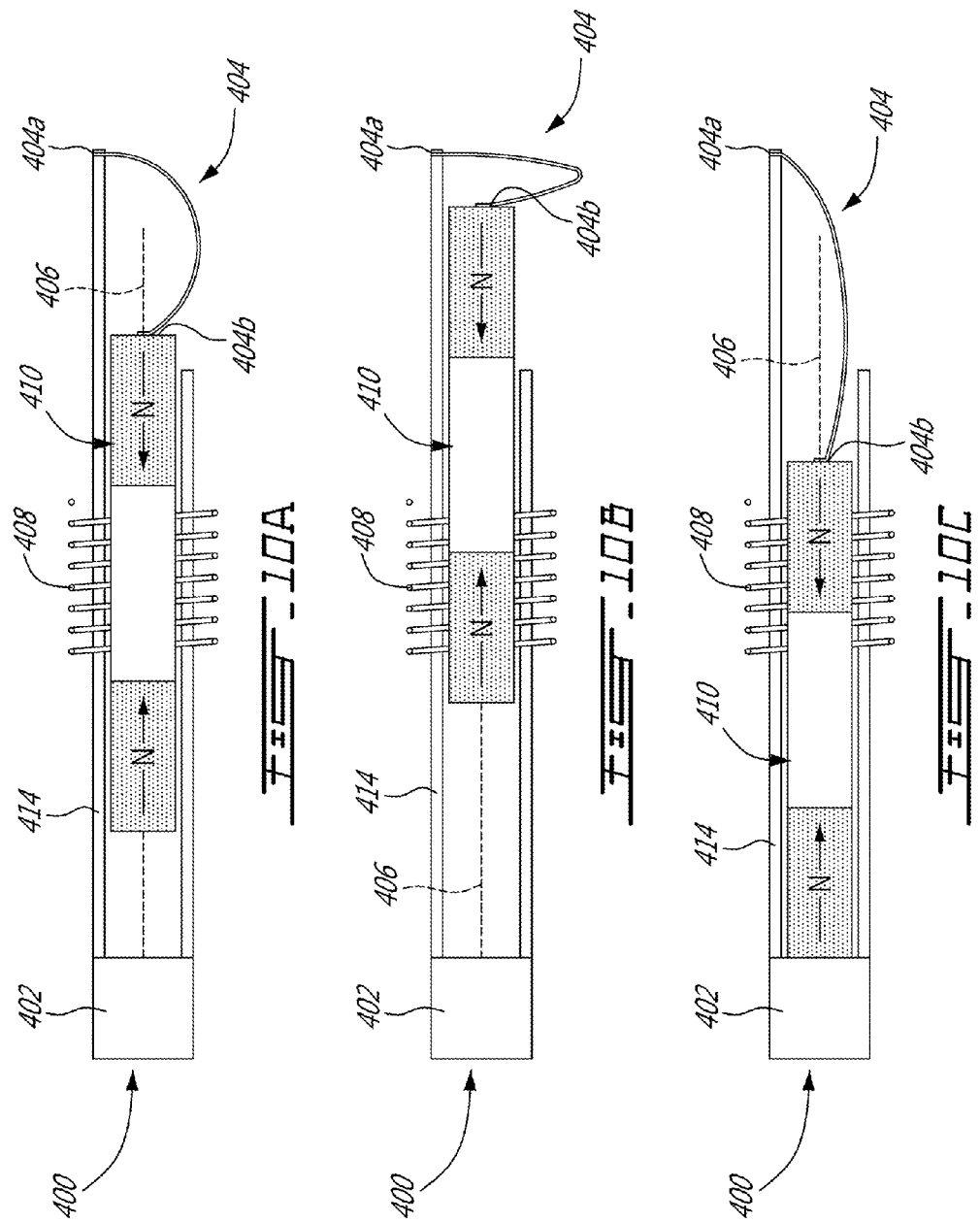

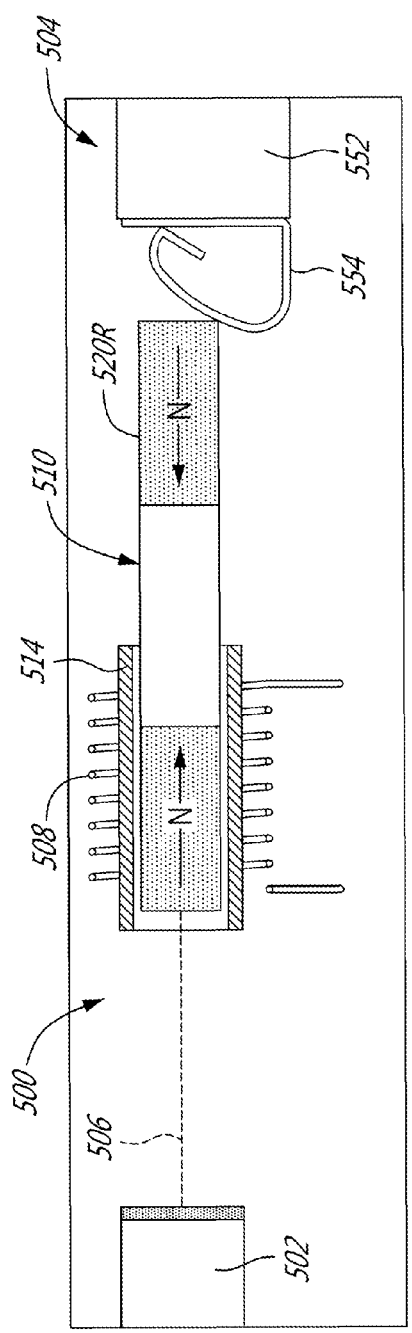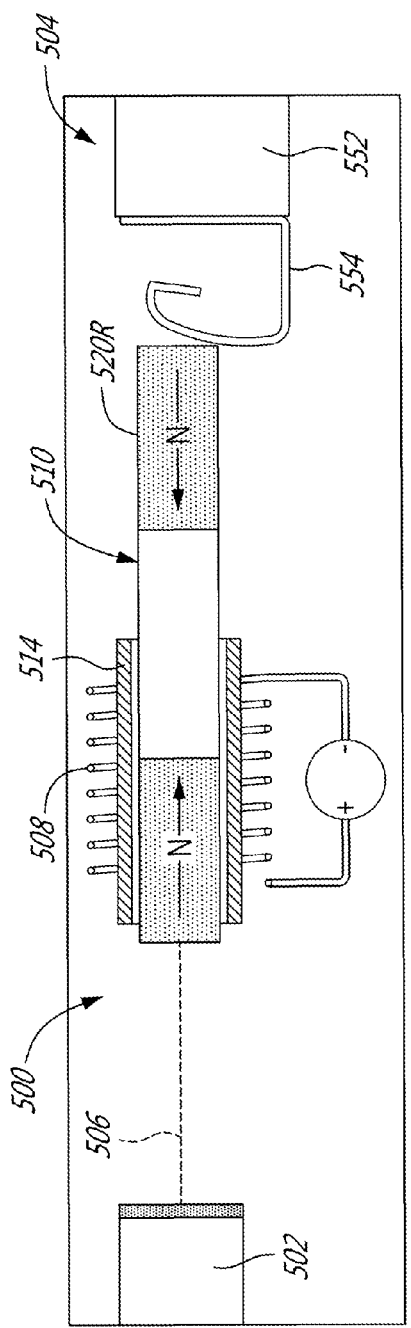

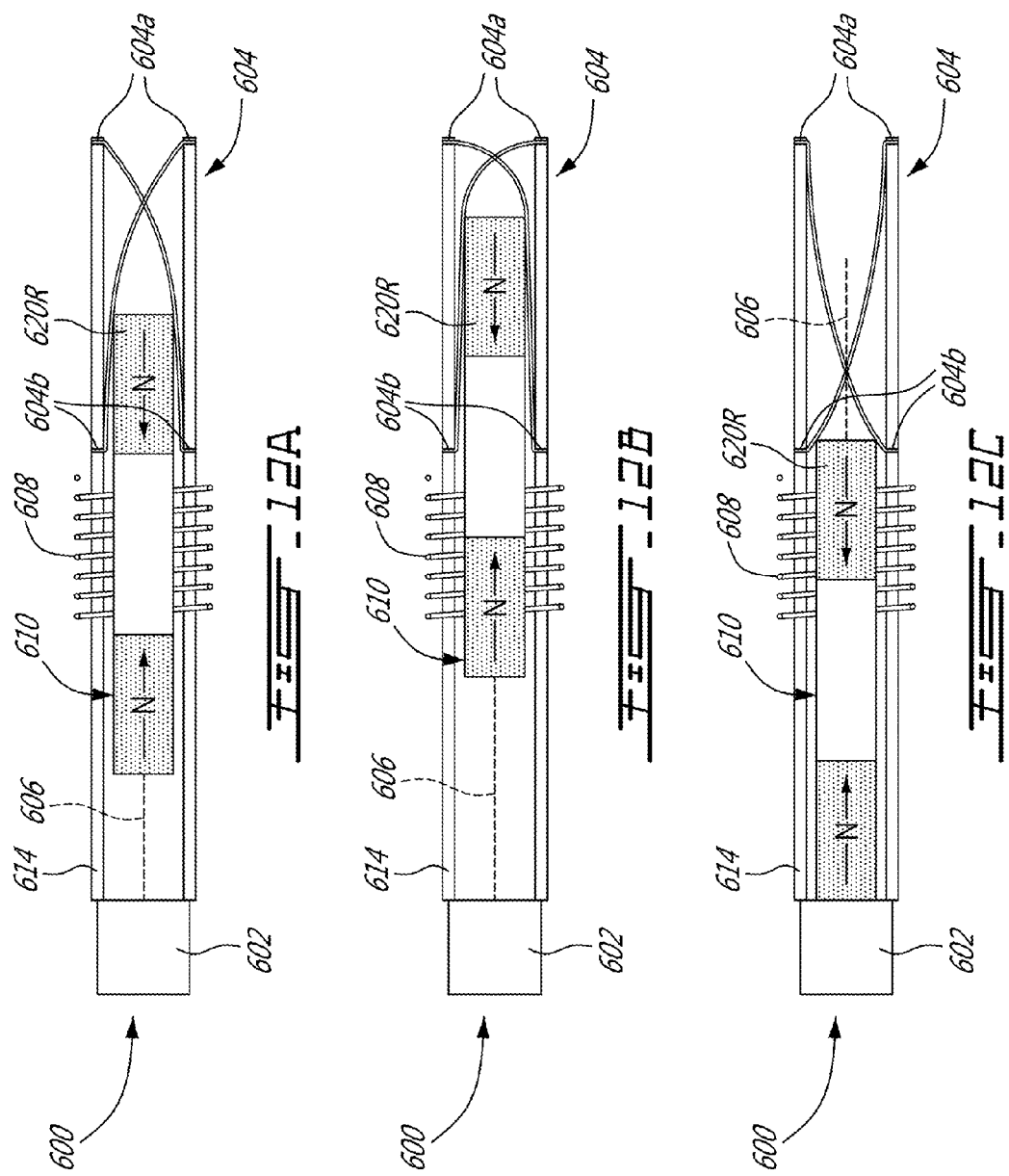

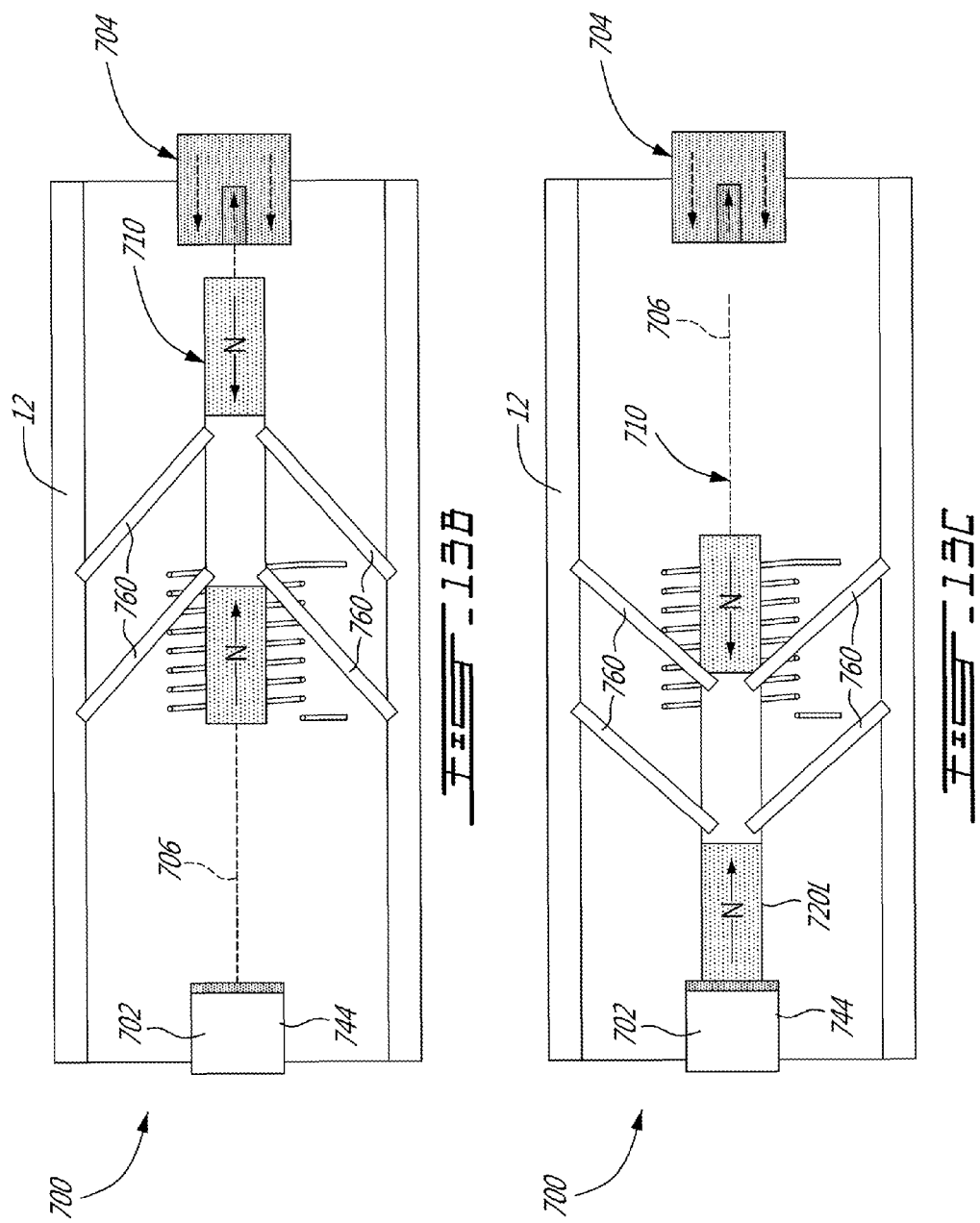

TACTILE FEEDBACK ACTUATOR, ELECTRONIC DEVICE USING SAME, AND METHOD OF OPERATING SAME

REFERENCE TO RELATED APPLICATIONS

This patent application claims priority of U.S. provisional Application Ser. No. 62/354,538, filed on Jun. 24, 2016, the content of which is hereby incorporated by reference.

FIELD

The improvements generally relate to the field of electronic devices and more specifically to tactile feedback actuators for use in electronic devices.

BACKGROUND

Mechanical actuators have been used in electronic devices to provide tactile (a form of haptic) feedback. Such tactile feedback may be used, for example, to simulate the feel of a mechanical button when a user interacts with an interface without a mechanical button, e.g., a touch pad or a touchscreen, or to generate a vibration alert. An example of a tactile feedback actuator is described in United States Patent Publication No. 2015/0349619.

Although existing tactile feedback actuators have been satisfactory to a certain degree, there remained room for improvement. For instance, there remained room for improvement in providing a tactile feedback actuator in which a magnetic hammer is controlled to perform a vibration, and in providing a tactile feedback actuator in which a magnetic hammer can be controlled selectively to provide either a vibration/silent mode and an audible mode.

SUMMARY

In accordance with an aspect, there is provided a tactile feedback actuator which provides a rest position for the magnetic hammer. The rest position can be provided by exerting a force independent from the force generated by an electrical coil. This independent force can urge the hammer toward the dampened side when the hammer is moved away from the dampened side and from the rest position, at least to a certain extent.

In accordance with one aspect, there is provided a tactile feedback actuator having a stopper, a damper, a hammer path between the stopper and the damper, a coil element fixedly mounted relative to the hammer path, and a magnetic hammer guidingly mounted for movement along the hammer path, the magnetic hammer having two opposite ends, each end of the magnetic hammer having a corresponding permanent magnet, the two permanent magnets having opposing polarities, the magnetic hammer being electromagnetically engageable by a magnetic field emitted upon activation of the coil element so as to be longitudinally slid along the hammer path in any one of two opposite directions depending on a polarity of activation of the coil element, the stopper having a striking surface adapted for stopping the magnetic hammer, and the damper being adapted for decelerating the magnetic hammer as the magnetic hammer is longitudinally slid towards the damper.

In accordance with another aspect, there is provided a method of operating a tactile feedback actuator, the tactile feedback actuator having a magnetic hammer guidingly mounted for movement along a hammer path, a damper proximate to one end of the hammer path, and a coil element, the method comprising: a) activating the coil element in a first polarity for a given duration to accelerate the magnetic hammer in the direction towards the damper along the hammer path; b) decelerating the approaching magnetic hammer and then accelerating the magnetic hammer in the direction away from the damper along the hammer path, at least partially via the damper; c) activating the coil element in the first polarity for a given duration to accelerate the magnetic hammer in the direction towards the damper along the hammer path; and d) repeating the steps b) and c) to generate a tactile feedback.

In accordance with another aspect, there is provided an electronic device comprising a housing and a tactile feedback actuator mounted inside the housing, the tactile feedback actuator having a stopper, a damper, a hammer path between the stopper and the damper, a coil element fixedly mounted relative to the housing, and a magnetic hammer guidingly mounted for movement along the hammer path, the magnetic hammer having two opposite ends, each end of the magnetic hammer having a corresponding permanent magnet, the two permanent magnets having opposing polarities, the magnetic hammer being electromagnetically engageable by a magnetic field emitted upon activation of the coil element so as to be longitudinally slid along the hammer path in any one of two opposite directions depending on a polarity of activation of the coil element, the stopper having a striking surface adapted for stopping the magnetic hammer, and the damper being adapted for decelerating the magnetic hammer as the magnetic hammer is longitudinally slid towards the damper.

In accordance with another aspect, there is provided a tactile feedback actuator having a magnetic hammer guidingly mounted for movement along a hammer path, the hammer having two opposite ends, each end of the hammer having a corresponding hammer magnet, the two hammer magnets having opposing polarities, a coil element activatable to generate a magnetic field which electromagnetically engages the magnetic hammer so as to be moved by the magnetic hammer along the hammer path in a given one of two opposite directions depending on a polarity of activation of the coil element, and a damper proximate to one end of the hammer path, the damper having a ferromagnetic portion, and a damper magnet having a hammer-repulsive pole, the ferromagnetic portion and the damper magnet being arranged in a manner that in the absence of activation of the coil element, the overall forces imparted by the ferromagnetic portion and the damper magnet on the magnetic hammer cancel out when a portion of the magnetic hammer is at a rest position along the hammer path, attract the magnetic hammer when the portion of the magnetic hammer is between the rest position and the stopper, and repulse the magnetic hammer when the portion of the magnetic hammer is between the rest position and the damper.

Many further features and combinations thereof concerning the present improvements will appear to those skilled in the art following a reading of the instant disclosure.

DESCRIPTION OF THE FIGURES

In the figures,

FIG. 1 is a top plan view of an example of an electronic device incorporating a tactile feedback actuator, in accordance with an embodiment;

FIG. 2 is a top plan view of a first example of the tactile feedback actuator of FIG. 1, in accordance with an embodiment;

FIG. 2A is a cross-sectional view of the tactile feedback actuator of FIG. 1, taken along line 2A-2A of FIG. 2;

FIG. 2B is a cross-sectional view of the tactile feedback actuator of FIG. 1, taken along line 2B-2B of FIG. 2A;

FIG. 3 is a top plan view of a magnetic hammer of the tactile feedback actuator of FIG. 2, showing exemplary magnetic field lines therearound;

FIG. 5A and FIG. 5B show cross-sectional views of the tactile feedback actuator of FIG. 2 taken at different moments in time during a swing to the right of the magnetic hammer;

FIG. 6A and FIG. 6B show cross-sectional views of the tactile feedback actuator of FIG. 2 taken at different moments in time during a swing to the left of the magnetic hammer;

FIG. 7A is a graph showing an exemplary periodic activation function usable to activate a coil element of a tactile feedback actuator to generate both a tactile feedback and an audible feedback;

FIG. 7B is a graph showing an exemplary periodic activation function usable to activate a coil element of a tactile feedback actuator to generate a tactile feedback only;

FIG. 7C is a graph showing an exemplary periodic activation function usable to activate a coil element of a tactile feedback actuator to generate a tactile feedback of an increased strength relatively to the tactile feedback generated using the activation function of FIG. 7B;

FIG. 9 is a cross-sectional view of a third example of a tactile feedback actuator including spring mounts, in accordance with an embodiment;

FIG. 10A is a cross-sectional view of a fourth example of a tactile feedback actuator including a leaf spring, in accordance with an embodiment;

FIG. 10B is a cross-sectional view of the tactile feedback actuator of FIG. 10A, showing the leaf spring in a curled state;

FIG. 10C is a cross-sectional view of the tactile feedback actuator of FIG. 10A, showing the leaf spring in an uncurled state;

FIG. 11A is a cross-sectional view of a fifth example of a tactile feedback actuator including a contact spring, in accordance with an embodiment;

FIG. 11B is a cross-sectional view of the tactile feedback actuator of FIG. 11A, showing the contact spring in a curled state;

FIG. 12A is a cross-sectional view of a sixth example of a tactile feedback actuator including scissor springs, in accordance with an embodiment;

FIG. 12B is a cross-sectional view of the tactile feedback actuator of FIG. 12A, showing the scissor springs in a curled state;

FIG. 12C is a cross-sectional view of the tactile feedback actuator of FIG. 12A, showing the scissor springs in an uncurled state;

FIG. 13B is a cross-sectional view of the tactile feedback actuator of FIG. 13A, showing the magnetic hammer in a first rest position; and FIG. 13C is a cross-sectional view of the tactile feedback actuator of FIG. 13A, showing the magnetic hammer in a second rest position.

DETAILED DESCRIPTION

Figure 2C:
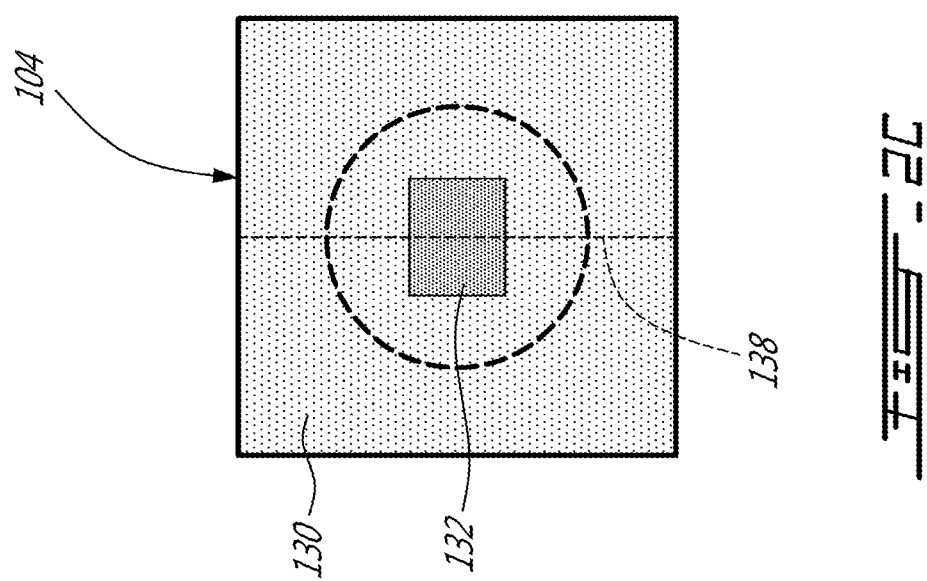
FIG. 2C is a cross-sectional view of the tactile feedback actuator of FIG. 1, taken along line 2C-2C of FIG. 2.

FIG. 1 shows a first example of an actuator 100 that can be operated to provide tactile feedback.

As depicted, the actuator 100 can be included in a handheld electronic device 10 (e.g., a smartphone, a tablet, a remote control, etc.). The actuator 100 can also be used to provide vibration/buzzing/audible functions in the electronic device 10, in lieu of a conventional vibration generator (e.g., a piezoelectric actuator).

The electronic device 10 generally has a housing 12 to which a tactile input interface 14 is provided. For instance, the tactile input interface 14 can be a touch-sensitive sensor or pressure sensor (of capacitive or resistive types). The tactile input interface 14 can include a touch-screen display. As shown in this example, the housing 12 houses and encloses the actuator 100 and a controller 16. The controller 16 is in communication with the tactile input interface 14 and with the actuator 100. The controller 16 can be part of a computer of the electronic device 10 and/or be provided in the form of a separate micro-controller. It is noted that the electronic device 10 can include other electronic components such as ones found in conventional electronic devices. An example of an electronic device incorporating a pressure-sensitive user interface is described in PCT Patent Application No. PCT/CA2015/051110.

The controller 16 can be used to operate the actuator 100. For instance, during use, the tactile input interface 14 can receive a touch by a user which causes the interface 14 to transmit a signal to the controller 16 which, in turn, operates the actuator 100 to provide a tactile feedback, an audible feedback, or both, in response to the touch.

As can be appreciated, FIG. 2 is a top plan view of the actuator 100; FIG. 2A is a cross-sectional view of the actuator 100, taken along line 2A-2A of FIG. 2; FIG. 2B is a cross-sectional view of the actuator 100, taken along line 2B-2B of FIG. 2A; and FIG. 2C is a cross-sectional view of the actuator 100, taken along line 2C-2C of FIG. 2.

As depicted, the actuator 100 has a stopper 102, a damper 104, a hammer path 106 between the stopper 102 and the damper 104, and a coil element 108 fixedly mounted relative to the hammer path, as defined by the stopper 102 and the damper 104. A magnetic hammer 110 is guidingly mounted for movement along the hammer path 106.

As will be described herebelow, the magnetic hammer 110 is electromagnetically engageable by a magnetic field emitted upon activation of the coil element 108 so as to be longitudinally slid along the hammer path 106 in any one of two opposite directions depending on a polarity of activation of the coil element 108.

The stopper 102 has a striking surface 112 adapted for stopping the magnetic hammer 110 when the magnetic hammer 110 is longitudinally slid towards the stopper 102. In some embodiments, both an audible feedback and a tactile feedback are produced when the magnetic hammer 110 strikes the striking surface 112 of the stopper 102.

The damper 104 has a first function of decelerating the magnetic hammer 110 as the magnetic hammer 110 is longitudinally slid towards the damper 104. Accordingly, only a tactile feedback is produced when the magnetic hammer 110 is decelerated by the damper 104. The damper 104 can have a second function of providing a rest position (shown in FIG. 2B) to the magnetic hammer 110 wherein the magnetic hammer 110 is in a stable equilibrium along the hammer path 106 when the coil element 108 is deactivated.

In some embodiments, the stopper 102, the damper 104 and the coil element 108 are fixedly mounted to a housing 12. However, in some other embodiments, the stopper 102, the damper 104 and the coil element 108 are fixedly mounted to an interior of the electronic device 10.

The magnetic hammer 110 can be guidingly mounted relative to the coil element 108 differently depending on the embodiments. For instance, in the illustrated embodiment, a hammer path guide 114 is fixedly mounted relative to the stopper 102, the damper 104 and the coil element 108. More specifically, the hammer path guide 114 is provided along the hammer path 106, within the coil element 108 and snugly around the magnetic hammer 110 to longitudinally guide the magnetic hammer 110 in either direction. As best seen in FIG. 2A, the hammer path guide 114 is provided in the form of a sleeve. In this example, the magnetic hammer 110 defines a hollow center cavity 116 in which the magnetic hammer 110 is slidingly received. Any other suitable type of hammer path guide can be used. As described further below, such a hammer path guide can be omitted in some embodiments.

As illustrated, the coil element 108 is activatable by a signal source 124. The electromagnetic engagement between the coil element 108 and the magnetic hammer 110 is described in the following paragraphs.

More specifically, and referring now to FIG. 2B, the magnetic hammer 110 has two opposite ends 118L, 118R. Each end 118L, 118R of the magnetic hammer 110 has a corresponding one of two permanent magnets 120L, 120R. As depicted, the permanent magnet 120L is provided proximate to the stopper 102 and the permanent magnet 120R is provided proximate to the damper 104.

For clarity, in this disclosure, it will be noted that reference numerals identified with the letter L will refer to elements shown at the left-hand side of the page whereas the letter R will refer to elements shown at the right-hand side of the page. For instance, the permanent magnet 120L refers to a first one of the two permanent magnets and is shown at the left-hand side of the page. Similarly, the permanent magnet 120R refers to a second one of the two permanent magnets and is shown at the right-hand side of the page. This nomenclature will apply to other components of the actuator 100.

The two permanent magnets 120L, 120R have opposing polarities. For ease of understanding, north and south poles of such permanent magnets are identified with corresponding tags N or S. As will be described below, the two permanent magnets 120L, 120R have opposing polarities such that their magnetic poles form a S-N-N-S arrangement or a N-S-S-N arrangement along the magnetic hammer 110.

Each permanent magnet 120L, 120R can include one or more permanent magnet units each sharing a similar polarity orientation. For instance, the permanent magnet 120L can include two permanent magnet units arranged such that the north pole of one of the two permanent magnet units be abutted on a south pole of the other one of the two permanent magnet units. Each permanent magnet 120L, 120R can be made from a rare earth material, such as Neodymium-Iron-Boron (NdFeB), Samarium-cobalt, or from iron, nickel or any suitable alloys.

As can be seen, the magnetic hammer 110 has a middle segment 126 separating the two permanent magnets 120L, 120R. The middle segment 126 can be made from a ferromagnetic material or from any other suitable material.

As mentioned above, a first function of the damper 104 can be to decelerate the magnetic hammer 110 as the magnetic hammer 110 is longitudinally slid along the hammer path 106 towards the damper 104, and a second function of the damper 104 can be to provide a rest position where the magnetic hammer 110 is in a stable equilibrium between the stopper 102 and the damper 104, such as shown in FIG. 2B.

Many embodiments of the damper 104 can be provided, some of them are described herebelow. As will be described, some example dampers, such as the damper 104, achieve these functions using magnetic dampening only whereas some other example dampers achieve these functions using both magnetic dampening and mechanical dampening. More specifically, in some embodiments, both the first and second functions can be achieved using magnetic dampening. However, in some other embodiments, the first function may be achieved using mechanical dampening, magnetic dampening, or both, whereas the second function may be achieved using only magnetic dampening. In yet other embodiments, both the first and second functions can be achieved using mechanical dampening.

In this example, the damper 104 is provided in the form of a magnetic dampening assembly and will be referred to as "the magnetic dampening assembly 104". In this example, the magnetic dampening assembly 104 is adapted to achieve these two functions using magnetic dampening.

More specifically, the magnetic dampening assembly 104 has a ferromagnetic portion 130 and a damper magnet 132 having a hammer-repulsive pole. As will be understood, the permanent magnet 120R of the magnetic hammer 110 tends to attract the ferromagnetic portion 130 when the magnetic hammer 110 approaches the magnetic dampening assembly 104. In contrast, the permanent magnet 120R of the magnetic hammer 110 tends to repel the hammer-repulsive pole of the damper magnet 132 when the magnetic hammer 110 approaches the magnetic dampening assembly 104.

The ferromagnetic portion 130 and the damper magnet 132 are arranged in a manner that in the absence of activation of the coil element 108, the overall magnetic forces imparted by the ferromagnetic portion 130 and the damper magnet 132 on the magnetic hammer 110 i) mutually cancel out when a portion of the magnetic hammer 110 is at a rest position along the hammer path 106; ii) attract the magnetic hammer 110 when the portion of the magnetic hammer 110 is between the rest position and the stopper 102, and iii) repulse the magnetic hammer 110 when the portion of the magnetic hammer 110 is between the rest position and the magnetic dampening assembly 104.

Still referring to the embodiment illustrated in FIG. 2B, the portion of the magnetic hammer 110 is defined as a tip 136 of the permanent magnet 120R. However, the portion can be any reference part of the permanent magnet 120R proximate to the magnetic dampening assembly 104.

In some embodiments, the ferromagnetic portion 130 of the magnetic dampening assembly may include an unmagnetized ferromagnetic material. For instance, the ferromagnetic portion 130 may be made of steel. Other suitable unmagnetized ferromagnetic material may apply.

However, in this specific embodiment, the ferromagnetic portion 130 of the magnetic dampening assembly 104 includes a permanent magnet (referred to as "the attractor magnet 131") having a hammer-attracting pole. In this case, the attractor magnet 131 and the damper magnet 132 have opposing polarities. Each of the attractor and damper magnets 131 and 132 may be made from a rare earth material, such as Neodymium-Iron-Boron (NdFeB), Samarium-cobalt, or from iron, nickel or suitable alloys. It is noted that using the attractor magnet 131 instead of an unmagnetized ferromagnetic material can help decrease the size of the ferromagnetic portion 130, which may be convenient.

In this example, the attractor magnet 131 is substantially larger than the damper magnet 132 such that the net effect of the magnetic fields emanating from the magnetic dampening assembly 104 is to attract the permanent magnet 120R of the magnetic hammer 110 and cause the magnetic hammer 110 to move towards the magnetic dampening assembly 104 when the tip 136 of the magnetic hammer 110 is between the stopper 102 and the rest position. However, when the magnetic hammer 110 is pulled sufficiently close to the magnetic dampening assembly 104 (between the rest position and the magnetic dampening assembly 104), the repulsive force of the damper magnet 132 exerted on the permanent magnet 120R of the magnetic hammer 110 cancels out the attractive force of the attractor magnet 131 exerted on the permanent magnet 120R of the magnetic hammer 110. In between, the magnetic hammer 110 is in a stable equilibrium at the rest position, such as shown in FIG. 2B. A similar effect can be achieved with an attractor magnet that is a stronger magnet than the damper magnet, for instance.

In this example, the magnetic hammer 110 and the magnetic dampening assembly 104 are aligned with one another and substantially parallel to the hammer path 106. As shown in FIG. 2C, the attractor magnet 131 and the damper magnet 132 are aligned with a silhouette 138.

Activation of the coil element 108 to move the magnetic hammer 110 in either direction can be described as follows. As shown in FIG. 3, the permanent magnets 120L, 102R of the magnetic hammer 110 have opposing polarities and thus produce magnetic field lines such as the one shown in this figure. For instance, as can be seen, the north pole of each of the two permanent magnets 120L, 120R is provided inwardly towards the middle segment 126 whereas the south pole of each of the two permanent magnets 120L, 120R is provided outwardly from the middle segment 126.

The middle segment 126 is optional. For instance, in an embodiment where the middle segment 126 is omitted, the two permanent magnets 120L, 120R are fastened together with sufficient strength to overcome the repelling forces between them.

Referring back to FIGS. 2, 2A, and 2B, the coil element 108 includes a plurality of turns or windings 140 of a conductive wire of a given diameter which wrap around the hammer path guide 114. The coil element 108 includes two wire ends 142L, 142R to which is connected the signal source 124. In some embodiments, the coil element 108 includes 200-500 turns of 0.2 mm gauge insulated copper wire. In these embodiments, the hammer path guide 114 is provided in the form of a sleeve having an outer diameter of about 3.2 mm and the hollow center cavity 116 has an inner diameter of about 3 mm, as best seen in FIG. 2A.

In the embodiment shown, the two permanent magnets 120L, 120R have a cylindrical shape of a length Lm of 6 mm and a diameter just under 3 mm (sized to fit through the hollow center cavity 116 of the hammer path guide 114). Still in this embodiment, the middle segment 126 has a cylindrical shape of a length of 7 mm and a diameter similar to the one of the two permanent magnets 120L, 120R. It will be understood that people of ordinary skill in the art can choose alternate dimensions for alternate embodiments.

The lengths of the two permanent magnets 120L, 120R and of the middle segment 126 can be selected in dependence of the span S of windings 140 of the coil element 108 as shown in FIG. 2. It is understood that the magnetic hammer 110 is positioned such that when the permanent magnet 120L abuts on the stopper 102, the permanent magnet 120L is positioned so as to be attracted/pulled by the coil element 108 towards the center of the span S (to the right), and permanent magnet 120R is positioned so as to be repelled/pushed towards the magnetic dampening assembly 104. Similarly, when the magnetic hammer 110 is positioned at the rest position proximate to the magnetic dampening assembly 104, the permanent magnet 120R is positioned so as to be attracted/pulled by the coil element 108 towards the center of the span S, and the permanent magnet 120L is positioned so as to be repelled/pushed towards the stopper 102 when the coil element 108 is activated in the opposite polarity.

The magnetic field produced by the coil element 108 depends on the output of the signal source 124 (shown in FIG. 2), which governs the direction and amplitude of current flow in the coil element 108. Of interest is the direction of the magnetic field lines of the coil element 108 and the effect on the magnetic hammer 110 as to whether it repels or attracts corresponding ones of the two permanent magnets 120L, 120R.

The coil element 108 can be activated by applying a given voltage V to the wire ends 142L, 142R via the signal source 124. When activated, the coil element 108 forms an electromagnet having a given magnetic polarity with north (N) and south (S) poles at opposing sides of the coil element 108. This given magnetic polarity can be inverted by inverting the voltage V applied to the wire ends 142L, 142R.

Figure 4A:
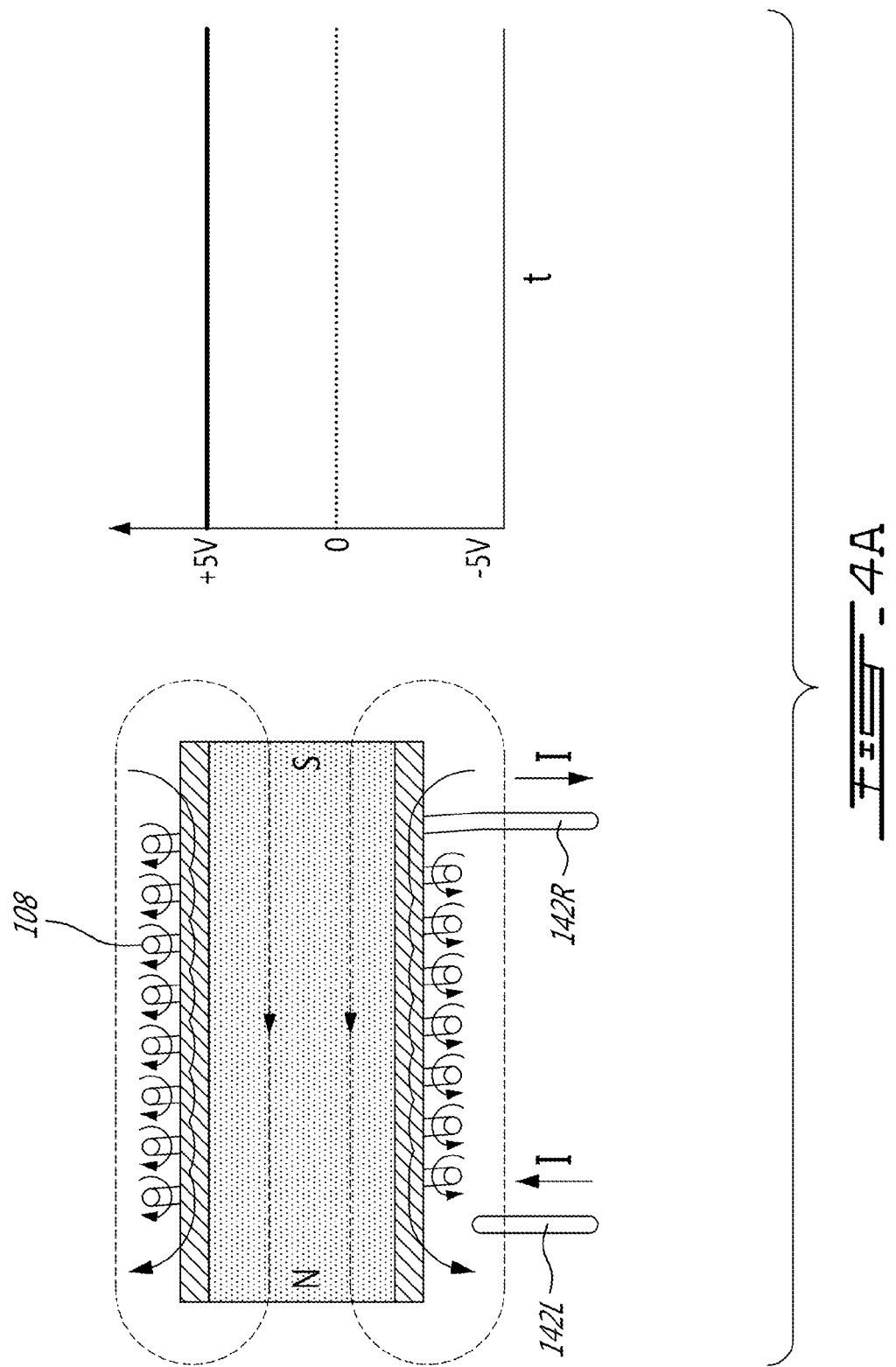
FIG. 4A is a sectional view of a coil element of the tactile feedback actuator of FIG. 2, showing exemplary magnetic field lines therearound when the coil element is activated with a first polarity.
Figure 4B:
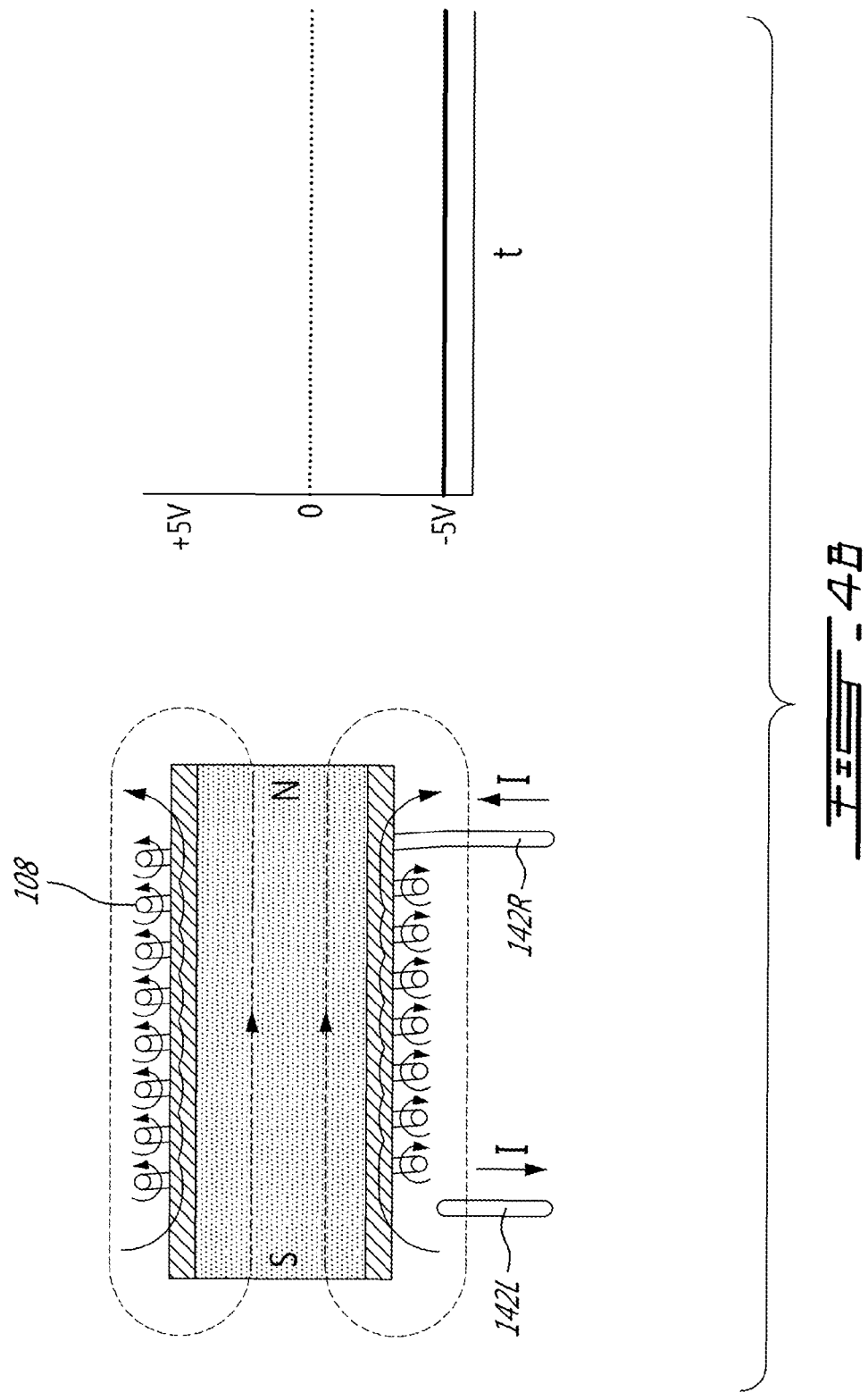
FIG. 4B is a sectional view of a coil element of the tactile feedback actuator of FIG. 2, showing exemplary magnetic field lines therearound when the coil element is activated with a second polarity.

For instance, FIG. 4A shows that a given voltage of 5 V is applied to the coil element 108 whereas FIG. 4B shows that a given voltage of −5 V is applied to the coil element 108. In other words, changing the polarity of the voltage applied by the signal source is equivalent to inverting the flow direction of the electrical current I along the conductive wire of the coil element 108, and to inverting the polarity of the electromagnet, as shown by the upwards and downwards arrows near wire ends 142L, 142R shown in FIGS. 4A and 4B.

For ease of reading, in the following paragraphs, the activation of the coil element 108 as shown in FIG. 4A can be referred to as "activation with a first polarity" whereas the activation of the coil element 108 as shown in FIG. 4B can be referred to as "activation with a second polarity". The first polarity being opposite to that of the first polarity.

During operation of the actuator 100, as detailed below with reference to FIGS. 5A and 5B, the coil element 108 can be activated to cause the magnetic hammer 110 to move towards the magnetic dampening assembly 104, in which case the magnetic dampening assembly 104 dampens the movement of the magnetic hammer 110 to prevent a strike between the magnetic hammer 110 and the magnetic dampening assembly 104 to provide a tactile feedback but not an audible feedback.

FIGS. 5A and 5B show an example of a movement sequence of the magnetic hammer 110 wherein the magnetic hammer 110 initially rests at a rest position proximate the magnetic dampening assembly 104, moves rightward towards the magnetic dampening assembly 104, in response to the activation of the coil element 108, and is repelled back to the rest position by the magnetic dampening assembly 104 when the coil element 108 is deactivated.

More specifically, FIGS. 5A and 5B include a snapshot at different moments in time t1 to t5 during the movement sequence wherein t5>t4>t3>t2>t1. As shown in FIG. 5A at moment in time t1, the magnetic hammer 110 is in the rest position. At this stage, the coil element 108 is not activated. The repulsive force of the damper magnet 132 exerted on the permanent magnet 120R of the magnetic hammer 110 cancels out the attractive force of the attractor magnet 131 exerted on the permanent magnet 120R of the magnetic hammer 110. There is thus both a magnetic attraction between the permanent magnet 120R and the ferromagnetic portion 130, and a magnetic repulsion between the permanent magnet 120R and the damper magnet 132 which maintains the magnetic hammer 110 in the rest position.

To initiate the movement of the magnetic hammer 110 in this sequence, the controller activates the coil element 108 by a voltage of a second polarity (e.g., −5V) to the coil element 108 via the signal source 124 in a manner to generate a magnetic force between the coil element 108 and the magnetic hammer 110. Such activation of the coil element 108 is maintained for the moments in time t2 and t3.

As shown in FIG. 5A, at moment in time t2, the activation of the coil element 108 causes acceleration of the magnetic hammer 110 from the rest position to a given velocity towards the magnetic dampening assembly 104. At this point, the activation of the coil element 108 attracts the permanent magnet 120L and repels the permanent magnet 120R towards the magnetic dampening assembly 104.

As shown in FIG. 5A at moment in time t3, the activation of the coil element 108 still causes the coil element 110 to attract the permanent magnet 120L and repel the permanent magnet 120R towards the magnetic dampening assembly 104. However, the magnetic repelling between the damper magnet 132 of the magnetic dampening assembly 104 and the permanent magnet 120R causes the magnetic hammer 110 to decelerate, eventually at a null speed, to avoid striking the magnetic dampening assembly 104.

As shown in FIG. 5B at moment in time t4, the tip 136 of the magnetic hammer is between the rest position and the magnetic dampening assembly 104 and the magnetic repelling between the damper magnet 132 and the permanent magnet 120R causes the magnetic hammer 110 to "bounce" without striking the magnetic dampening assembly 104 and to move towards the rest position, even when the coil element 108 is deactivated. In this way, a tactile feedback is produced but no audible feedback is produced.

As shown in FIG. 5B at moment in time t5, the magnetic hammer 110 returns to the rest position wherein the magnetic attraction between the permanent magnet 120R and the ferromagnetic portion 130 and the magnetic repelling between the permanent magnet 120R and the damper magnet 132 both maintain the magnetic hammer 110 at the rest position.

Operation of the actuator 100 as shown in FIGS. 5A and 5B can create a first feedback including a tactile feedback. For instance, the first feedback can be provided in response to press of a button on a touchscreen of an electronic device including the actuator 100. The movement of the magnetic hammer 110 is dampened by the magnetic dampening assembly 104, and the magnetic hammer 110 does not strike the magnetic dampening assembly 104. Accordingly, the first feedback may be felt, but not heard.

Conversely, during operation of the actuator 100, as detailed below with reference to FIGS. 6A and 6B, the coil element 108 can be activated to push the magnetic hammer 110 towards the stopper 102, in which case the striking surface 112 of the stopper 102 can stop the movement of the magnetic hammer 110 to provide both a tactile feedback and an audible feedback (e.g., an audible click).

Figure 6A:
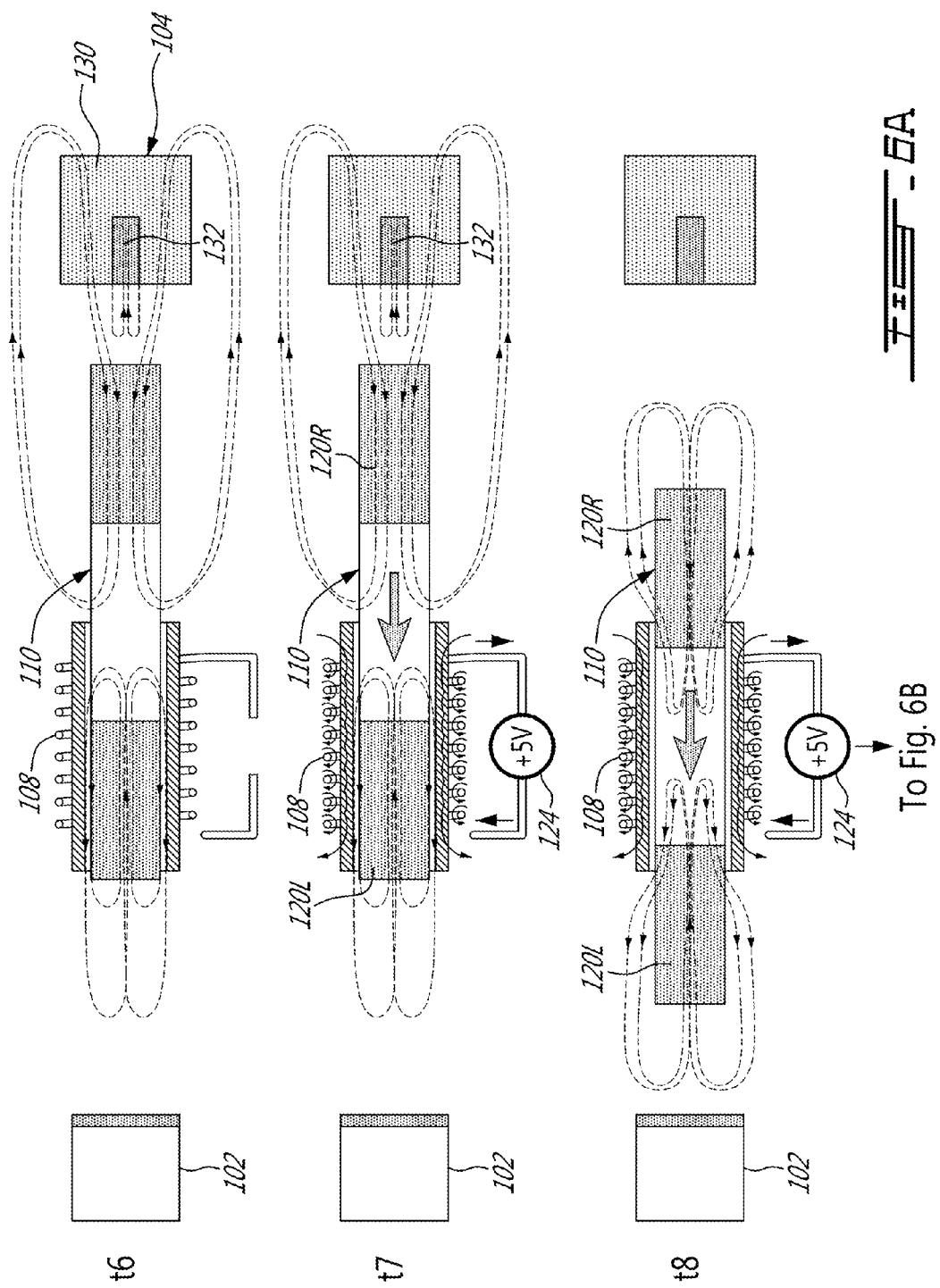

FIGS. 6A and 6B show an example of another movement sequence of the magnetic hammer 110 wherein the magnetic hammer 110 initially rests at a first rest position, proximate to the magnetic dampening assembly 104, moves leftward towards the stopper 102 to a second rest position, in response to the activation of the coil element 108.

More specifically, FIGS. 6A and 6B include a snapshot at different moments in time t6 to t10 during the movement sequence wherein t10>t9>t8>t7>t6. As shown in FIG. 6A, at moment in time t6, the magnetic hammer 110 is in the first rest position. At this stage, the coil element 108 is not activated. Both the magnetic attraction between the permanent magnet 120R and the ferromagnetic portion 130 and the magnetic repulsion between the permanent magnet 120R and the damper magnet 132 maintain the magnetic hammer 110 in the first rest position.

As shown in FIG. 6A, at moment in time t7, the activation of the coil element 108 with a first polarity (e.g., +5V) causes acceleration of the magnetic hammer 110 from the first rest position to a given velocity towards the stopper 102. At this point, the activation of the coil element 108 repels the permanent magnet 120L and attracts the permanent magnet 120R towards the stopper 102. The magnetic repelling between the damper magnet 132 and the permanent magnet 120R can help in this step.

As shown in FIG. 6A at moment in time t8, the activation of the coil element 108 still causes the coil element 108 to repel the permanent magnet 120L and attracts the permanent magnet 120R towards the stopper 102.

As shown in FIG. 6B, at moment in time t9, the magnetic hammer 110 strikes the striking surface 112 of the stopper 102 at the given velocity which stops the movement of the magnetic hammer 110.

Operation of the actuator 100 as shown in FIGS. 6A and 6B can create a second feedback including both a tactile feedback and an audible feedback. For instance, the second feedback can be provided in response to press of a button on a touchscreen of an electronic device including actuator 100. The strike of the magnetic hammer 110 against the stopper 102 can be audible, e.g., to simulate the sound of a button being depressed (e.g., a click or a tap). Accordingly, the second feedback may be felt and heard. In some embodiments, the first feedback (i.e. the vibration) is weaker than the second feedback. This may be desirable if an electronic device is in a silent mode, or for providing feedback that is less intrusive.

As shown in FIG. 6B, at moment in time t9, in some embodiments, the magnetic hammer 110 is maintained in the second rest position wherein the permanent magnet 120L abuts on the striking surface 112 of the stopper 102 even when the coil element 108 is deactivated. In these embodiments, the magnetic hammer 110 is maintained at the second rest position via magnetic attraction.

For instance, in these embodiments, the stopper 102 has a ferromagnetic portion 144 made integral thereto. The stopper 102 can be made in whole or in part of a ferromagnetic material (e.g., iron, nickel, cobalt, alloys thereof) so as be magnetically attracted by the permanent magnet 120L of the magnetic hammer 110. In the illustrated embodiment, however, the stopper 102 has a non-ferromagnetic portion 146 which is made integral to the ferromagnetic portion 144 of the stopper 102.

The ferromagnetic portion 144 of the stopper 102 can be sized to be sufficiently large to maintain the magnetic hammer 110 at the second rest position, but sufficiently small to allow the coil element 108 to induce the magnetic hammer 110 to move away from that second rest position when desired. For instance, the ferromagnetic portion 144 of the stopper 102 can be a steel plate.

The non-ferromagnetic portion 146 of the stopper 102 can be made of a non-ferromagnetic material (e.g., aluminium) such that it does not attract the magnetic hammer 110. The non-ferromagnetic portion 146 of the stopper 102 can be made of a material that transmits forces/vibrations imparted by the magnetic hammer 110 when striking the stopper 102. Referring back to FIG. 2, the stopper 102, and more specifically its non-ferromagnetic portions 146, is fixedly mounted relatively to the housing 12 such as to mechanically couple the actuator 100 to the housing 12 of the electronic device 10 to transmit forces/vibrations through such components. In some embodiments, the stopper 102 can be made out only of a ferromagnetic material. However, in this case, the stopper 102 is adapted such that magnetic attraction between the magnetic hammer 110 and the stopper 102 can allow the coil element 108 to dislodge the magnetic hammer 110 from the second rest position.

As will be understood, when the coil element 108 is not activated, the magnetic hammer 110 can be maintained in the first rest position via a combination of magnetic attraction and magnetic repelling or the magnetic hammer 110 can be maintained in the second rest position via magnetic attraction.

In some other embodiments, the stopper 102 can be made from a material that is not ferromagnetic (e.g., aluminium). In this case, the actuator 100 only has the first rest position proximate to the magnetic dampening assembly 104. The material of the stopper 102 can be chosen for the sound made when the magnetic hammer 110 strikes its striking surface 112.

It is noted that the actuator 100 can be operated to perform any of the movement sequences described above either punctually to provide a punctual feedback or sequentially to provide a series of punctual feedback over a given duration.

For instance, the actuator 100 can be operated to perform the movement sequence shown in FIGS. 6A and 6B, wherein the magnetic hammer 110 moves from the first rest position to the second rest position, sequentially to provide a series of punctual feedback over a given duration. Such a movement can be obtained by activating the coil element 108 with a voltage of a first polarity until the magnetic hammer 110 travels from the first rest position proximate to the magnetic dampening assembly 104 to the stopper 102 to the second rest position in abutment on the stopper 102 and by subsequently activating the coil element 108 with a voltage of a second polarity until the magnetic hammer 110 travels back to the first rest position proximate to the magnetic dampening assembly 104. This specific movement would cause the second feedback including a tactile feedback and an audible feedback and then cause the first feedback including a tactile feedback only, after which the movement of the magnetic hammer 110 can be stopped.

The actuator 100 can be operated such as to create a series of feedback. This behavior can be used to create vibration at the electronic device 10.

For instance, FIG. 7A shows an example activation function representing the voltage that can be applied to the coil element 108 by the signal source over time so as to force the magnetic hammer 110 to oscillate between the stopper 102 and the magnetic dampening assembly 104 to provide alternating first and second feedbacks, which can translate into a vibration accompanied by an audible series of clicks or taps. Such an oscillating movement includes a plurality of half cycles (of half period T/2) or of full cycles (of period T) performed in a successive manner for a given amount of time. In this example, the magnetic hammer 110 starts at the second rest position.

Alternately, FIG. 7B shows an example activation function representing the voltage that can be applied to the coil element 108 by the signal source over time so as to force the magnetic hammer 110 to oscillate between the first rest position and the magnetic dampening assembly 104 to provide the first feedback at each bounce. As can be seen, the activation of the coil element 108 includes maintaining the coil element 108 deactivated for a given duration. This activation function may be used to create a weaker vibration, which does not provide audible feedback.

FIG. 7C shows another example activation function representing the voltage that can be applied to the coil element 108 by the signal source over time to provide a feedback without any audible feedback. As can be seen, the activation of the coil element 108 includes activating the coil element 108 in the second polarity for a given duration and in the first polarity for a given duration, wherein the activation in the first polarity and the activation in the second polarity differ in at least one of amplitude and duration. Specifically, in this example, this activation function may be used to cause the magnetic hammer 110 to oscillate between the stopper 102 and the magnetic dampening assembly 104 without striking the stopper 102. More specifically, a short pulse (of duration A) of +5 V is used to move the magnetic hammer 110 towards the stopper 102 without striking it, and a longer pulse (of duration B) of −5 V is used to move the magnetic hammer 110 towards the magnetic dampening assembly 104.

The activation function shown in FIG. 7C can increase the amplitude of the vibration compared to the activation function shown in FIG. 7B, as the magnetic hammer 110 is accelerated towards the magnetic dampening assembly 104 over a longer portion of the hammer path 106. Duration A is selected to cause the magnetic hammer 110 to move closer to the stopper 102 without striking it. A similar technique may be used to increase the force by which the magnetic hammer 110 strikes the stopper 102. In particular, the coil element 108 can be activated in the second direction to cause the magnetic hammer 110 to move towards the magnetic dampening assembly 104, before reversing the polarity of the coil element 108 to cause the magnetic hammer 110 to move towards the stopper 102 (and striking it). Indeed, if the activation of the coil element 108 is correctly timed, it can amplify the 'rebounding' action of the magnetic dampening assembly 104 to generate greater velocity and a stronger strike against the stopper 102.

Optionally, the amplitude and/or duty cycle of the activation function applied by the signal source can be adjusted, e.g., using a software stored on a memory of the controller of the electronic device. For example, the amplitude and/or the period can be adjusted to change, respectively, the strength and/or the frequency of the vibration of the tactile and/or audible feedback. It is noted that square waves can be generated easily, though the frequency and duty cycle can be controlled. To avoid an impact between the magnetic hammer and the stopper, one can change the polarity of the coil element at a moment in time before the magnetic hammer strikes it, and in sufficient time to decelerate the magnetic hammer. The precise timing can need to be tuned. In another embodiment, the effects of gravity are compensated using a position sensor (e.g., a Hall-effect sensor to detect the magnetic field as affected by the position of the magnetic hammer) provided as part of the actuator and/or as part of the electronic device. For instance, to provide feedback for controlling the coil element (e.g., a PIO controller or similar). A sensor based on current flowing through the coil element is used in another embodiment, although it is harder to measure current than to measure the magnetic field.

Referring back to FIG. 2, an example profile of force exerted by the magnetic dampening assembly 104 on the magnetic hammer 110 which is counter to the force exerted on the magnetic hammer 110 by the coil element 108 is shown at the bottom of the page. For example, when the coil element 108 is operated to move the magnetic hammer 110 from the first rest position towards the stopper 102 (in region 1), the magnetic dampening assembly 104 can provide an attraction force that pushes the magnetic hammer 110 towards the rest position. In this region, the magnetic attraction between the permanent magnet 120R and the ferromagnetic portion 130 takes precedence over the magnetic repelling between the permanent magnet 120R and the damper magnet 132. In contrast, when the coil element 108 is operated to move the magnetic hammer 110 from the first rest position towards the magnetic dampening assembly 104 (region 2), the magnetic dampening assembly 104 provides a counter force that increases as the distance decreases. In this region, the magnetic repelling between the permanent magnet 120R and the damper magnet 132 takes precedence over the magnetic attraction between the permanent magnet 120R and the ferromagnetic portion 130. Specifically, the counter force is proportional to the inverse fourth power of the distance in this example. However, the counter force can vary differently in other embodiments. For instance, in some embodiments, the counter force provided by the magnetic dampening assembly 104 in the region 2 can be approximately constant.

Actuator 200—Second Example

Figure 8:
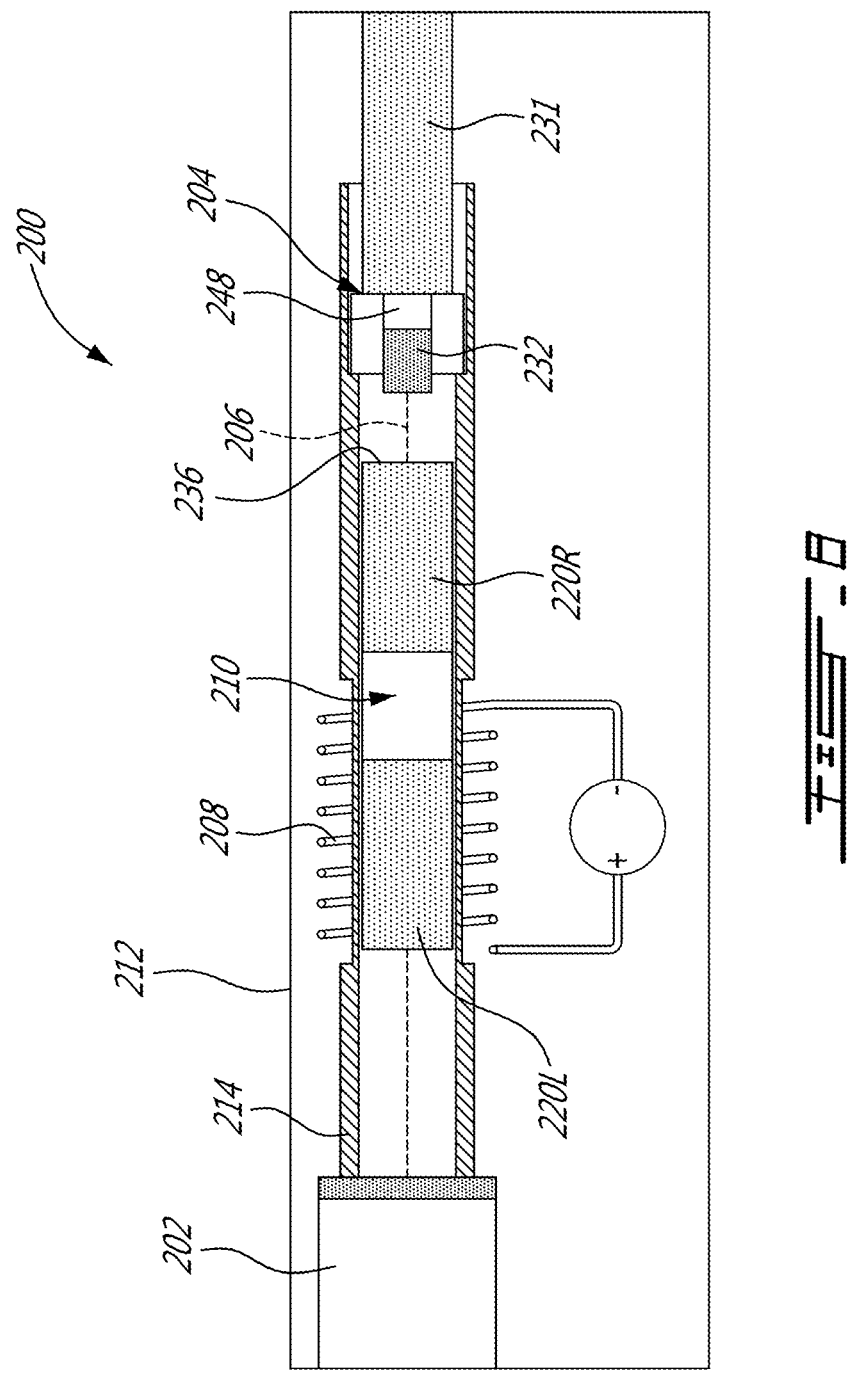
FIG. 8 is a cross sectional view of a second example of a tactile feedback actuator, in accordance with an embodiment.

FIG. 8 shows a second example of an actuator 200 according to another embodiment. Still in this example, the first and second functions of the damper described above can be achieved using magnetic dampening via the magnetic dampening assembly 204. More specifically, the actuator 200 has a magnetic hammer 210 slidable along a hammer path 206 between a stopper 202 and the magnetic dampening assembly 204. Either or both the first and second feedbacks described above can be provided using the actuator 200.

As shown, the actuator 200 has a coil element 208 fixedly mounted relatively to a housing 212 (e.g., a device interior), and the magnetic hammer 210 is longitudinally slidable along the hammer path 206 upon activation of the coil element 208. In these embodiments, the actuator 200 can be operated such that the generation of feedback is responsive to activating the coil element 208 with an activation function such as the ones shown in FIGS. 7A, 7B and 7C. However, it is understood that any other suitable activation function can be used in order to provide either or both the first and second feedbacks described above.

In this specific embodiment, the magnetic dampening assembly 204 has an attractor magnet 231 separated from a damper magnet 232 via a spacer 248. The spacer 248 can be made from a ferromagnetic material. In this embodiment, the actuator 200 includes a hammer path guide 214 provided in the form of an elongated sleeve containing the magnetic hammer 210, and the magnetic dampening assembly 204.

As depicted, the magnetic hammer 210 is in the first rest position, wherein the tip 236 of the permanent magnet 220R of the magnetic hammer 210 is about 2.25 mm from the damper magnet 232. As it will be understood, any electronic device, such as the electronic device 10 of FIG. 1, can include the actuator 200.

Actuator 300—Third Example

FIG. 9 shows a third example of an actuator 300 according to another embodiment. In this example, the first and second functions of the damper described above can be achieved using mechanical dampening via the mechanical dampening assembly 304.

More specifically, the actuator 300 has a magnetic hammer 310 slidable along a hammer path 306 between two extremities of the hammer path 306. One of the two extremities of the hammer path 306 is proximate to the stopper 302 whereas the other one of the two extremities of the hammer path 306 is at the opposite of the stopper 302. Either or both the first and second feedbacks described above can be provided using the actuator 300.

As depicted, the magnetic hammer 310 is mounted to a housing of an electronic device (e.g., the housing 12) using spring mounts 350 which are part of the mechanical dampening assembly 304. The spring mounts 350 can be configured to dampen the movement of the magnetic hammer 310 when the magnetic hammer 310 is moving in a direction away from the stopper 302. More specifically, the spring mounts 350 can be configured such that movement of the magnetic hammer 310 causes the spring mounts 350 to uncurl (thus causing minimal counterforce), and movement of the magnetic hammer 310 causes the spring mounts 350 to curl and provide a counterforce. The spring mounts 350 may be formed of leaf springs.

In this embodiment, the magnetic dampening assembly 104 of FIG. 2 and 204 of FIG. 8 can be omitted as the dampening is provided by the mechanical dampening assembly 304.

Actuator 400—Fourth Example

FIGS. 10A, 10B and 100 show a fourth example of an actuator 400 according to another embodiment. In this example, the first and second functions of the damper described above can be achieved using mechanical dampening via the mechanical damper 404.

More specifically, the actuator 400 has a magnetic hammer 410 slidable along a hammer path 406 and inside a hammer path guide 414. More specifically, the hammer path guide 414 is provided along the hammer path 406, within the coil element 408 and snugly around the magnetic hammer 410 to longitudinally guide the magnetic hammer 410 in either direction along the hammer path 406. Either or both the first and second feedbacks described above can be provided using the actuator 400.

As depicted in this example, the mechanical damper 404 includes a leaf spring (referred to as "leaf spring 404") having an end 404a attached to the hammer path guide 414 and another end 404b attached to the magnetic hammer 410. At rest, the leaf spring 404 is adapted to provide the magnetic hammer 410 at the rest position shown in FIG. 10A.

As shown in FIG. 10B, the leaf spring 404 is in a curled state. More specifically, upon activation of the coil element 408 to move the magnetic hammer 410 towards the leaf spring 404, the leaf spring 404 curls to decelerate the magnetic hammer 410 which produces the first feedback, which can be felt but not heard.

In contrast, as shown in FIG. 10C, the leaf spring 404 is in an uncurled state. Specifically, upon activation of the coil element 408 to move the magnetic hammer 410 towards the stopper 402, the leaf spring 404 uncurls such as to allow the magnetic hammer 410 to strike the stopper 402 and produce the second feedback, which can be felt and heard.

Actuator 500—Fifth Example

FIGS. 11A and 11B show a fifth example of an actuator 500 according to another embodiment. In this example, the first and second functions of the damper described above can be achieved using both magnetic and mechanical dampening via the damper assembly 504.

As shown, the actuator 500 has a magnetic hammer 510 slidable along a hammer path 506 and inside a hammer path guide 514. More specifically, the hammer path guide 514 is provided along the hammer path 506, within the coil element 508 and snugly around the magnetic hammer 510 to longitudinally guide the magnetic hammer 510 in either direction along the hammer path 506 and between the stopper 502 and the damper assembly 504. The damper assembly 504 can include any suitable type of spring (e.g., a coil spring, a leaf spring, etc.).

In this example, the damper assembly 504 includes a base 552 fixed relative to the stopper 502 and a contact spring 554. FIG. 11A shows the contact spring 554 in a curled state. More specifically, the contact spring 554 is used to dampen the movement of the magnetic hammer 510 as it is moved toward the damper assembly 504 to provide the first feedback, as shown in FIG. 11A.

In some embodiments, the contact spring 554 is made of a ferromagnetic material such that magnetic attraction between the permanent magnet 520R of the magnetic hammer 510 provides the first rest position as shown in FIG. 11B. In some other embodiments, the base 552 is made of a ferromagnetic material such that magnetic attraction between the permanent magnet 520R of the magnetic hammer 510 provides for the first rest position. In alternate embodiments, both the contact spring 554 and the base 552 are made of a ferromagnetic material, or eventually of a permanent magnet.

In some embodiments, the contact spring 554 is directly fixed relative to a housing (e.g., the housing 12 of the electronic device 10) such that the base 552 can be omitted. In this case, the damper assembly 504 can be referred to simply as a damper (not an assembly) and the contact spring 554 can be ferromagnetic.

Actuator 600—Sixth Example

FIGS. 12A, 12B and 12C show a sixth example of an actuator 600 according to another embodiment. In this example, the first and second functions of the damper described above can be achieved using mechanical and magnetic dampening via the mechanical damper 604.

More specifically, the actuator 600 has a magnetic hammer 610 slidable along a hammer path 606 and inside a hammer path guide 614. More specifically, the hammer path guide 614 is provided along the hammer path 606, within the coil element 608 and snugly around the magnetic hammer 610 to longitudinally guide the magnetic hammer 610 in either direction along the hammer path 606. Either or both the first and second feedbacks described above can be provided using the actuator 600.

As depicted in this example, the mechanical damper 604 includes a pair of scissor springs (referred to as "scissor springs 604") each having an end 604a attached at a distal location of the hammer path guide 614 and another end 604b attached at a proximal location of the hammer path guide 614. At rest, the scissor springs 604 are adapted to provide the magnetic hammer 610 at the rest position shown in FIG. 12A.

In this embodiment, the scissor springs 604 are made of a ferromagnetic material such that magnetic attraction between the permanent magnet 620R of the magnetic hammer 610 provides the rest position as shown in FIG. 12A.

FIG. 12B shows the scissor springs 604 in a curled state. Indeed, upon activation of the coil element 608 to move the magnetic hammer 610 towards the scissor springs 604, the scissor springs 604 curl to decelerate the magnetic hammer 610 which produces the first feedback, which can be felt but not heard.

In contrast, FIG. 12C shows the scissor springs 604 in an uncurled state. More specifically, upon activation of the coil element 608 to move the magnetic hammer 610 towards the stopper 602, the scissor springs 604 uncurl such as to allow the magnetic hammer 610 to strike the stopper 602 and produce the second feedback, which can be felt and heard.

Actuator 700—Seventh Example

Figure 13A:
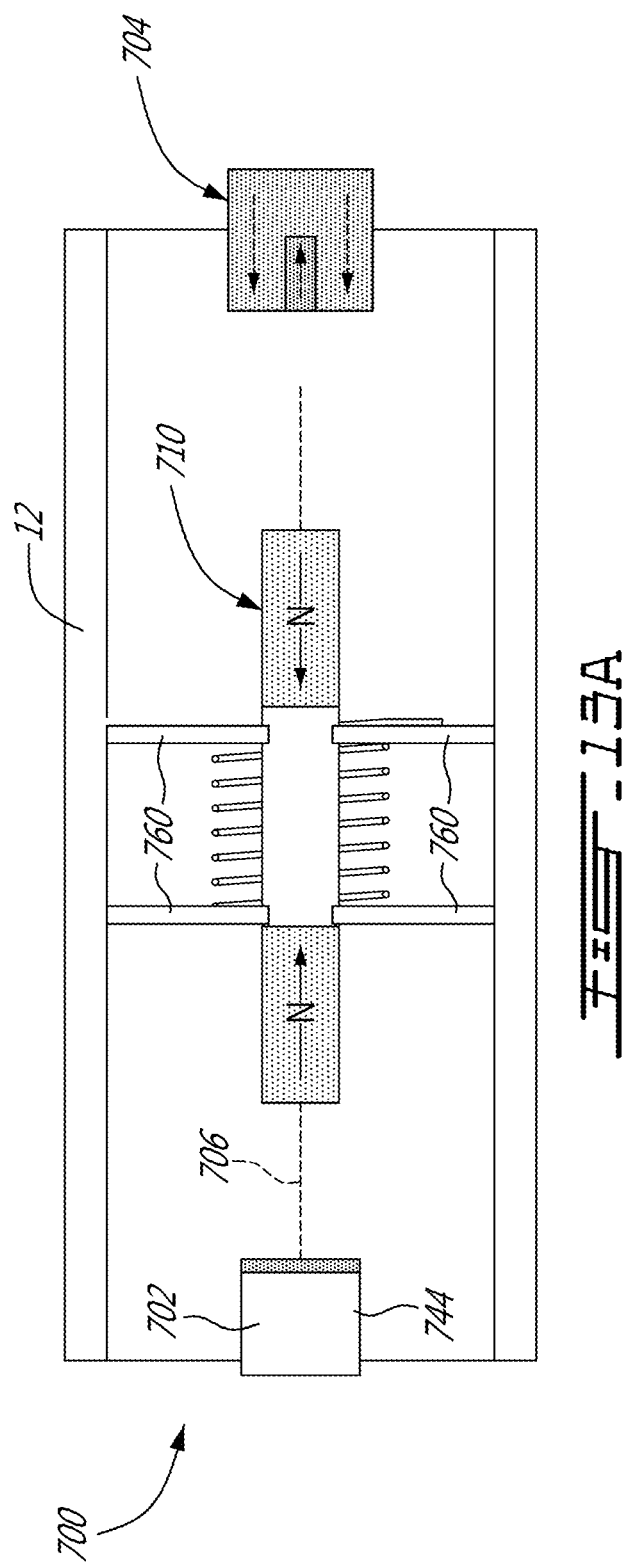
FIG. 13A is a cross-sectional view of a seventh example of a tactile feedback actuator including flexures, showing a magnetic hammer in a central rest position, in accordance with an embodiment.

FIGS. 13A, 13B and 13C show a seventh example of an actuator 700 according to another embodiment. In this example, the first and second functions of the damper described above can be achieved using magnetic dampening via the magnetic dampening assembly 704. The magnetic dampening assembly 704 is similar to the magnetic dampening assembly 104 and will thus not be described again.

In this example, the magnetic hammer 710 is mounted to a housing (e.g., the housing 12 of the electronic device 10 of FIG. 1) using flexures 760. Some example of flexures are described in the literature (e.g., see http://web.mit.edu/mact/www/Blog/Flexures/FlexureIndex.html for more information regarding flexures).

The flexures 760 are configured to constrain movement of the magnetic hammer 710 in a hammer path 706 between a stopper 702 and the magnetic dampening assembly 704. Providing an actuator 700 with the flexures 760 eliminates the need to provide a hammer path guide, such as shown at 114 in FIG. 2, to constrain movement of the magnetic hammer 710.

FIG. 13A shows the magnetic hammer 710 at a central rest position between the stopper 702 and the magnetic dampening assembly 704.

FIG. 13B shows the bending of the flexures 760 when the magnetic hammer 710 is moved towards the magnetic dampening assembly 704. As described above, in this case, the magnetic hammer 710 can be maintained in the first rest position.

In contrast, FIG. 13C shows the bending of the flexures 760 when the magnetic hammer 710 is moved towards the stopper 702. When a ferromagnetic portion 744 is provided to the stopper 702, attraction between the ferromagnetic portion 744 and the permanent magnet 720L of the magnetic hammer 710 can provide the second rest position.

As can be understood, the examples described above and illustrated are intended to be exemplary only. The scope is indicated by the appended claims.

What is claimed is:

1. A tactile feedback actuator having a stopper, a damper, a hammer path between the stopper and the damper, a coil element fixedly mounted relative to the hammer path, and a magnetic hammer guidingly mounted for movement along the hammer path, the magnetic hammer having two opposite ends, each end of the magnetic hammer having a corresponding permanent magnet, the two permanent magnets having opposing polarities, the magnetic hammer being electromagnetically engageable by a magnetic field emitted upon activation of the coil element so as to be longitudinally slid along the hammer path in any one of two opposite directions depending on a polarity of activation of the coil element, the stopper having a striking surface adapted for stopping the magnetic hammer, and the damper being adapted for decelerating the magnetic hammer as the magnetic hammer is longitudinally slid towards the damper.

2. The tactile feedback actuator of claim 1 wherein the damper is a magnetic dampening assembly including a ferromagnetic portion and a damper magnet having a hammer-repulsive pole.

3. The tactile feedback actuator of claim 2 wherein the ferromagnetic portion and the damper magnet are arranged in a manner that in the absence of activation of the coil element, the overall forces imparted by the ferromagnetic portion and the damper magnet on the magnetic hammer
  i) mutually cancel out when a portion of the magnetic hammer is at a rest position along the hammer path,
  ii) attract the magnetic hammer when the portion of the magnetic hammer is between the rest position and the stopper, and
  iii) repulse the magnetic hammer when the portion of the magnetic hammer is between the rest position and the magnetic dampening assembly.

4. The tactile feedback actuator of claim 2 wherein the ferromagnetic portion of the magnetic dampening assembly includes an attractor magnet having a hammer-attracting pole.

5. The tactile feedback actuator of claim 4 wherein the attractor magnet of the ferromagnetic portion and the damper magnet are spaced apart along the hammer path.

6. The tactile feedback actuator of claim 1 wherein the damper is a mechanical damper, the mechanical damper including at least one spring, each one of the at least one spring having a first end fixed relative an end of the hammer path opposite the stopper, and a second end engaged with the magnetic hammer.

7. The tactile feedback actuator of claim 6 wherein the at least one spring is arranged in a manner that in the absence of activation of the coil element, the overall forces imparted by the at least one spring on the magnetic hammer
  i) mutually cancel out when a portion of the magnetic hammer is at a rest position along the hammer path,
  ii) attract the magnetic hammer when the portion of the magnetic hammer is between the rest position and the stopper, and
  iii) repulse the magnetic hammer when the portion of the magnetic hammer is between the rest position and the mechanical damper.

8. The tactile feedback actuator of claim 6 wherein the at least one spring is a spring mount.

9. The tactile feedback actuator of claim 6 wherein the at least one spring is ferromagnetic, the second end of each of the at least one spring being magnetically engaged with an adjacent one of the two permanent magnets of the magnetic hammer.

10. The tactile feedback actuator of claim 6 wherein the second end of the at least one spring is mechanically attached to an adjacent one of the two permanent magnets of the magnetic hammer.

11. The tactile feedback actuator of claim 1 further comprising a hammer path guide fixed relative to the stopper, the hammer path guide being provided along the hammer path, within the coil element and snugly around the magnetic hammer to longitudinally guide the magnetic hammer in either direction along the hammer path.

12. The tactile feedback actuator of claim 1 wherein the damper exerts a progressively increasing counter-force as the magnetic hammer is moved towards the damper.

13. A method of operating a tactile feedback actuator, the tactile feedback actuator having a magnetic hammer guidingly mounted for movement along a hammer path, a magnetic dampening assembly proximate to one end of the hammer path, and a coil element, the method comprising:
  a) activating the coil element in a first polarity for a given duration to accelerate the magnetic hammer in the direction towards the magnetic dampening assembly along the hammer path;
  b) decelerating the approaching magnetic hammer and then accelerating the magnetic hammer in the direction away from the magnetic dampening assembly along the hammer path, at least partially via the magnetic dampening assembly;
  c) activating the coil element in the first polarity for a given duration to accelerate the magnetic hammer in the direction towards the magnetic dampening assembly along the hammer path; and
  d) repeating the steps b) and c) to generate a tactile feedback.

14. The method of claim 13, wherein step b) includes:
  maintaining the coil element deactivated for a given duration.

15. The method of claim 13 wherein step b) includes:
  activating the coil element in a second polarity for a given duration, wherein the activation in the first polarity and the activation in the second polarity differ in at least one of amplitude and duration.

16. The method of claim 15 wherein the tactile feedback actuator includes a stopper at another end of the hammer path, the activation in the second polarity causing the magnetic hammer to strike the magnetic hammer to generate a tactile feedback and an audible feedback.

17. An electronic device comprising a housing and a tactile feedback actuator mounted inside the housing, the tactile feedback actuator having a stopper, a damper, a hammer path between the stopper and the damper, a coil element fixedly mounted relative to the housing, and a magnetic hammer guidingly mounted for movement along the hammer path, the magnetic hammer having two opposite ends, each end of the magnetic hammer having a corresponding permanent magnet, the two permanent magnets having opposing polarities, the magnetic hammer being electromagnetically engageable by a magnetic field emitted upon activation of the coil element so as to be longitudinally slid along the hammer path in any one of two opposite directions depending on a polarity of activation of the coil element, the stopper having a striking surface adapted for stopping the magnetic hammer, and the damper being adapted for decelerating the magnetic hammer as the magnetic hammer is longitudinally slid towards the damper.

18. The electronic device of claim 17 wherein the damper is a magnetic dampening assembly including a ferromagnetic portion and a damper magnet having a hammer-repulsive pole.

19. The electronic device of claim 18 wherein the ferromagnetic portion and the damper magnet are arranged in a manner that in the absence of activation of the coil element, the overall forces imparted by the ferromagnetic portion and the damper magnet on the magnetic hammer
 i) mutually cancel out when a portion of the magnetic hammer is at a rest position along the hammer path,
 ii) attract the magnetic hammer when the portion of the magnetic hammer is between the rest position and the stopper, and
 iii) repulse the magnetic hammer when the portion of the magnetic hammer is between the rest position and the magnetic dampening assembly.

20. The electronic device of claim 17 wherein the damper is a mechanical damper, the mechanical damper including at least one spring, each one of the at least one spring having a first end fixed relative an end of the hammer path opposite the stopper, and a second end engaged with the magnetic hammer.

21. A method of operating a tactile feedback actuator, the tactile feedback actuator having a magnetic hammer guidingly mounted for movement along a hammer path, a damper proximate to one end of the hammer path, and a coil element, the method comprising:
 a) activating the coil element in a first polarity for a given duration to accelerate the magnetic hammer in the direction towards the damper along the hammer path;
 b) decelerating the approaching magnetic hammer and then accelerating the magnetic hammer in the direction away from the damper along the hammer path, at least partially via the damper, step b) including maintaining the coil element deactivated for a given duration;
 c) activating the coil element in the first polarity for a given duration to accelerate the magnetic hammer in the direction towards the damper along the hammer path; and
 d) repeating the steps b) and c) to generate a tactile feedback.

22. A method of operating a tactile feedback actuator, the tactile feedback actuator having a magnetic hammer guidingly mounted for movement along a hammer path, a damper proximate to one end of the hammer path, and a coil element, the method comprising:
 a) activating the coil element in a first polarity for a given duration to accelerate the magnetic hammer in the direction towards the damper along the hammer path;
 b) decelerating the approaching magnetic hammer and then accelerating the magnetic hammer in the direction away from the damper along the hammer path, at least partially via the damper, step b) including activating the coil element in a second polarity for a given duration, wherein the activation in the first polarity and the activation in the second polarity differ in at least one of amplitude and duration;
 c) activating the coil element in the first polarity for a given duration to accelerate the magnetic hammer in the direction towards the damper along the hammer path; and
 d) repeating the steps b) and c) to generate a tactile feedback.

23. The method of claim 22 wherein the tactile feedback actuator includes a stopper at another end of the hammer path, the activation in the second polarity causing the magnetic hammer to strike the magnetic hammer to generate a tactile feedback and an audible feedback.

* * * * *